United States Patent
Ichikawa

(10) Patent No.: US 10,500,964 B2
(45) Date of Patent: Dec. 10, 2019

(54) ELECTRIC POWER RECEPTION DEVICE FOR VEHICLE, ELECTRIC POWER TRANSMISSION DEVICE, AND NON-CONTACT ELECTRIC POWER TRANSMISSION/RECEPTION SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 14/353,829

(22) PCT Filed: Nov. 8, 2011

(86) PCT No.: PCT/JP2011/075673
§ 371 (c)(1),
(2), (4) Date: Apr. 24, 2014

(87) PCT Pub. No.: WO2013/069089
PCT Pub. Date: May 16, 2013

(65) Prior Publication Data
US 2014/0292270 A1    Oct. 2, 2014

(51) Int. Cl.
*H02J 7/00*    (2006.01)
*B60L 11/18*    (2006.01)
(Continued)

(52) U.S. Cl.
CPC ............ *B60L 11/1809* (2013.01); *B60L 7/14* (2013.01); *B60L 50/16* (2019.02); *B60L 50/51* (2019.02);
(Continued)

(58) Field of Classification Search
CPC ............ B60L 11/1809; B60L 11/1838; B60L 11/1846; B60L 11/1824; B60L 11/182;
(Continued)

(56) References Cited

U.S. PATENT DOCUMENTS 5,661,391 A * 8/1997 Ito .................. B60L 11/182
320/108
9,333,870 B2 * 5/2016 Kume ............... B60L 11/182
(Continued)

FOREIGN PATENT DOCUMENTS

CN        102163862 A    8/2011
JP        2010-35408 A    2/2010
(Continued)

OTHER PUBLICATIONS

Lu Xiao et al, "Wireless Charging Technologies: Fundamentals, Standards, and Network Applications", IEEE Communications Surveys and Tutorials, vol. 18, No. 2, pp. 1413-1452, Second Quarter 2016.
(Continued)

*Primary Examiner* — Jack Chiang
*Assistant Examiner* — Brandon Bowers
(74) *Attorney, Agent, or Firm* — Oliff PLC

(57) ABSTRACT

An electric power reception device for a vehicle is equipped with an electric power reception unit that is configured to be able to receive electric power from an electric power transmission device in a non-contact manner, a communication portion that transmits information on a position or dimension of the electric power reception unit to the electric power transmission device, and a vehicle ECU that controls the communication portion. Preferably, the vehicle ECU transmits pre-stored information to the electric power transmission device with the aid of the communication portion, before allowing a vehicle to be parked at an electric power reception position of the electric power transmission device. The information includes at least one of a size of the electric power reception unit, a size of the vehicle in which the electric power reception unit is mounted, and a mounting position of the electric power reception unit in the vehicle.

11 Claims, 20 Drawing Sheets

(51) Int. Cl.
| | |
|---|---|
| *H02J 50/80* | (2016.01) |
| *H02J 50/12* | (2016.01) |
| *B60L 7/14* | (2006.01) |
| *H02J 7/02* | (2016.01) |
| *B60L 50/16* | (2019.01) |
| *B60L 50/51* | (2019.01) |
| *B60L 53/00* | (2019.01) |
| *B60L 53/12* | (2019.01) |
| *B60L 53/30* | (2019.01) |
| *B60L 53/36* | (2019.01) |
| *B60L 53/60* | (2019.01) |
| *B60L 53/65* | (2019.01) |
| *B60L 53/51* | (2019.01) |
| *B60L 53/52* | (2019.01) |
| *H02J 5/00* | (2016.01) |

(52) U.S. Cl.
CPC ............... *B60L 53/00* (2019.02); *B60L 53/12* (2019.02); *B60L 53/30* (2019.02); *B60L 53/305* (2019.02); *B60L 53/36* (2019.02); *B60L 53/51* (2019.02); *B60L 53/52* (2019.02); *B60L 53/60* (2019.02); *B60L 53/65* (2019.02); *H02J 7/025* (2013.01); *H02J 50/12* (2016.02); *H02J 50/80* (2016.02); *B60L 2210/10* (2013.01); *B60L 2210/30* (2013.01); *B60L 2210/40* (2013.01); *B60L 2220/14* (2013.01); *B60L 2240/527* (2013.01); *B60L 2240/547* (2013.01); *B60L 2240/549* (2013.01); *B60L 2250/12* (2013.01); *B60L 2250/16* (2013.01); *H02J 5/005* (2013.01); *Y02T 10/70* (2013.01); *Y02T 10/7005* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .. B60L 11/1833; B60L 11/14; B60L 11/1803; B60L 7/14; B60L 2250/16; B60L 2230/10; B60L 2250/12; B60L 2240/547; B60L 2240/527; B60L 2210/10; B60L 2240/549; B60L 2210/30; B60L 2210/40; B60L 2230/22; B60L 2230/24; B60L 2220/14; B60L 2230/16; H02J 7/025; H02J 5/005; Y02T 90/169; Y02T 90/121; Y02T 10/7216; Y02T 90/127; Y02T 10/7088; Y02T 10/7077; Y02T 90/14; Y02T 90/128; Y02T 90/163; Y02T 90/122; Y02T 90/125; Y02T 90/16; Y02T 10/7005; Y04S 30/14

USPC ........................................................ 320/108
See application file for complete search history.

(56) References Cited

U.S. PATENT DOCUMENTS

| | | | |
|---|---|---|---|
| 2006/0033641 A1* | 2/2006 | Jaupitre | G08G 1/14 340/932.2 |
| 2006/0287763 A1* | 12/2006 | Ochi | G06Q 40/00 700/231 |
| 2009/0322281 A1 | 12/2009 | Kamijo et al. | |
| 2010/0161216 A1 | 6/2010 | Yamamoto | |
| 2010/0235006 A1* | 9/2010 | Brown | B60L 11/182 700/286 |
| 2010/0259217 A1* | 10/2010 | Baarman | H02J 5/005 320/108 |
| 2011/0082612 A1 | 4/2011 | Ichikawa | |
| 2011/0199028 A1 | 8/2011 | Yamazaki et al. | |
| 2011/0302078 A1* | 12/2011 | Failing | B60L 3/00 705/39 |
| 2012/0091959 A1* | 4/2012 | Martin | B60L 11/1829 320/109 |
| 2012/0095617 A1* | 4/2012 | Martin | B60L 11/1833 701/1 |
| 2012/0206098 A1 | 8/2012 | Kim | |
| 2013/0249470 A1* | 9/2013 | Martin | B60L 11/182 320/107 |
| 2015/0073642 A1* | 3/2015 | Widmer | G01C 21/36 701/22 |
| 2015/0151641 A1* | 6/2015 | Berger | B60L 11/1833 320/108 |
| 2016/0025821 A1* | 1/2016 | Widmer | G01R 33/0047 324/258 |

FOREIGN PATENT DOCUMENTS

| | | |
|---|---|---|
| JP | 2010-103200 A | 5/2010 |
| JP | 2010-172184 A | 8/2010 |
| JP | A-2010-183804 | 8/2010 |
| JP | A-2010-183812 | 8/2010 |
| JP | 2010-246348 A | 10/2010 |
| JP | A-2011-188733 | 9/2011 |
| JP | A-2011-217452 | 10/2011 |
| JP | A-2011-217460 | 10/2011 |
| KR | 2011-0042403 A | 4/2011 |
| WO | WO 2010/052785 A1 | 5/2010 |
| WO | 2011/049352 A2 | 4/2011 |
| WO | 2011/116394 A1 | 9/2011 |

OTHER PUBLICATIONS

Jul. 12, 2018 Office Action Issued in U.S. Appl. No. 15/981,293.
Jun. 28, 2019 Advisory Action Issued in U.S. Appl. No. 15/981,293.
Mar. 14, 2019 Office Action Issued in U.S. Appl. No. 15/981,293.
Sep. 19, 2019 Office Action Issued in U.S. Appl. No. 15/981,293.

* cited by examiner

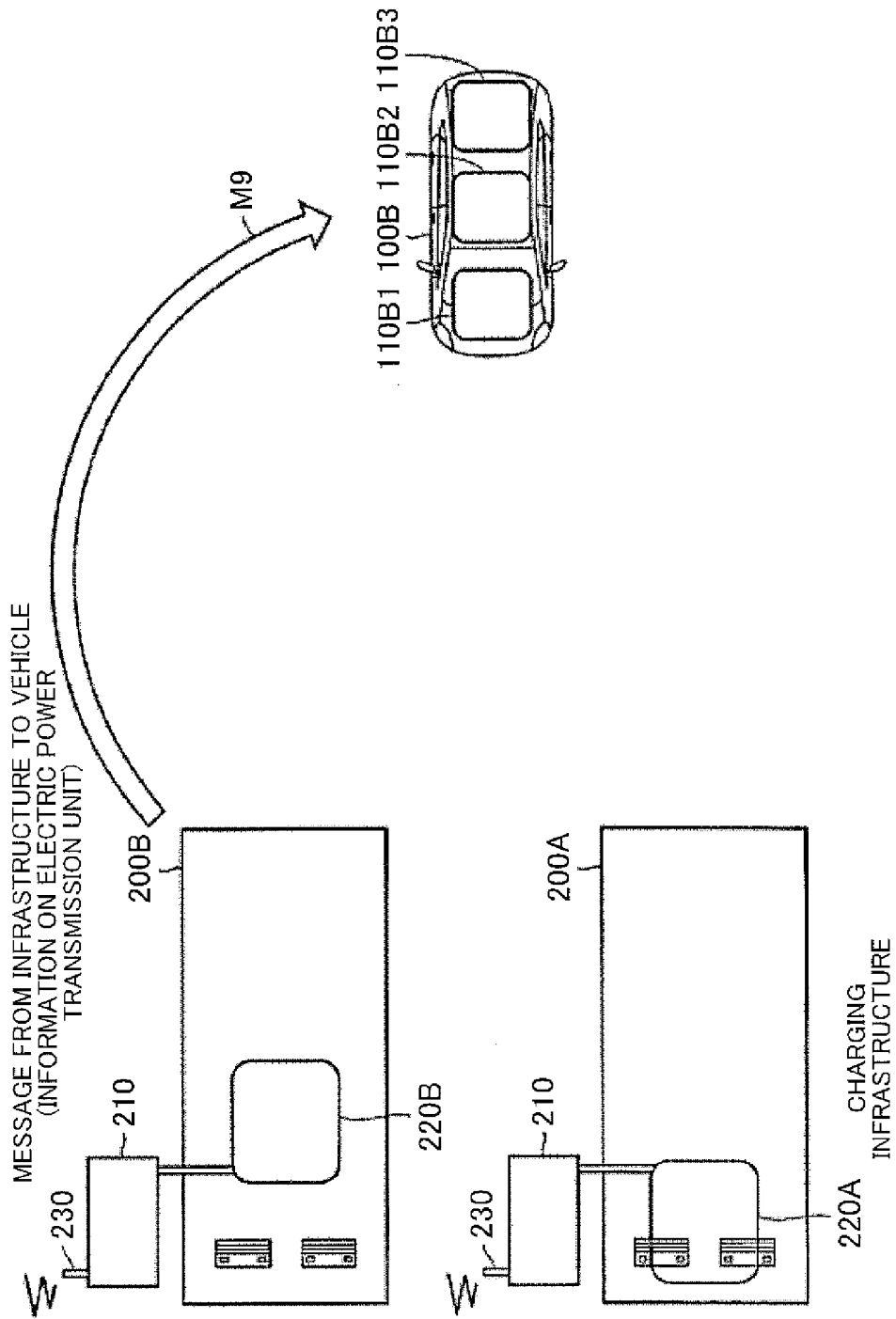

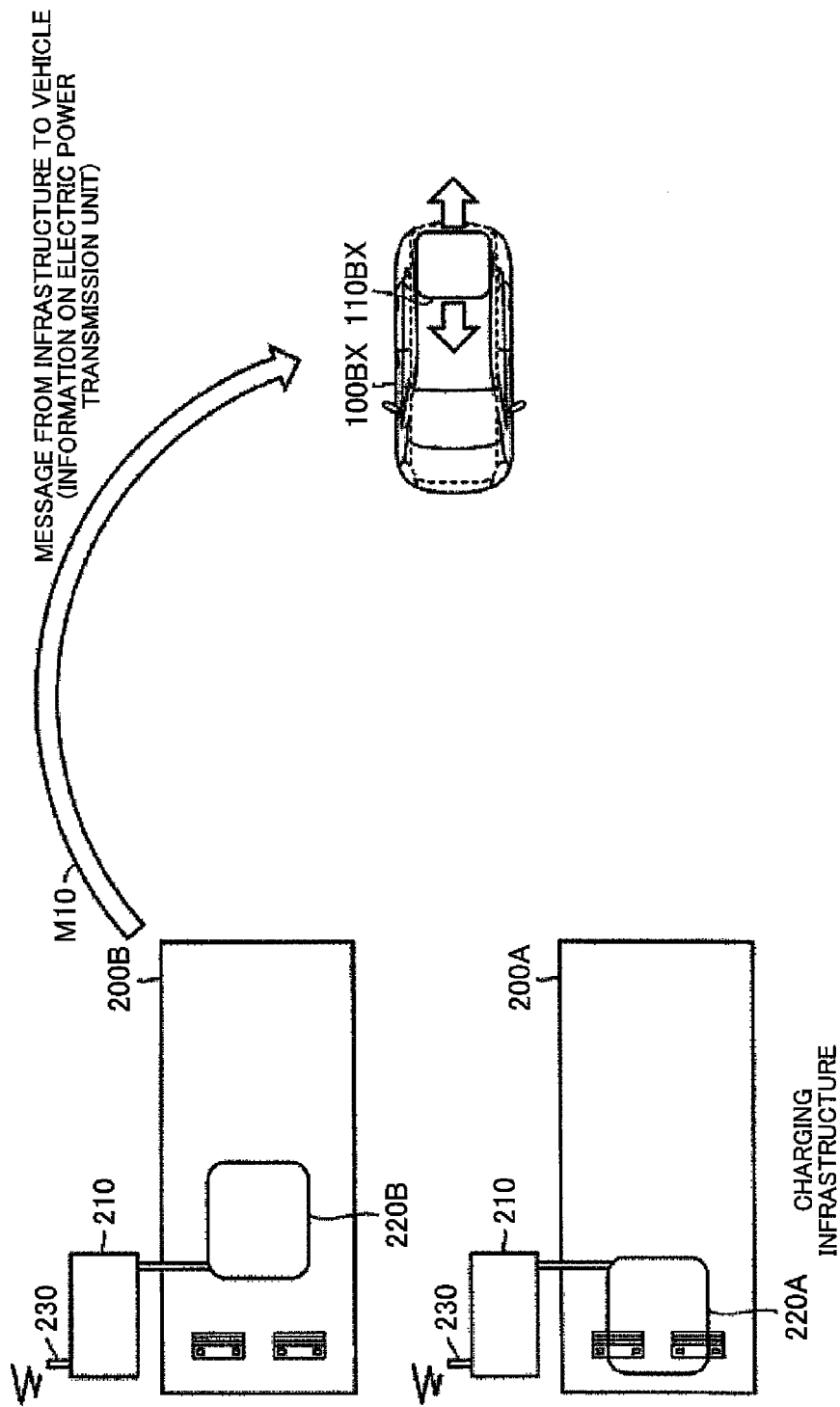

ELECTRIC POWER RECEPTION DEVICE FOR VEHICLE, ELECTRIC POWER TRANSMISSION DEVICE, AND NON-CONTACT ELECTRIC POWER TRANSMISSION/RECEPTION SYSTEM

TECHNICAL FIELD

This invention relates to an electric power reception device for a vehicle, an electric power transmission device, and a non-contact electric power transmission/reception system.

BACKGROUND ART

In recent years, electric vehicles and hybrid vehicles, which run by using electric energy instead of fuel or in addition to fuel with a view to reducing the amount of carbon dioxide discharged from the vehicles for the purpose of preventing global warming, have been attracting attention. Moreover, there have also been plug-in hybrid vehicles that are configured such that their batteries, which are also mounted in hybrid vehicles, can be charged with electric energy from outside the vehicles.

Furthermore, with a view to achieving an improvement in user-friendliness, technologies of feeding electric power in a non-contact manner have been reviewed as a method of feeding electric energy to a vehicle from outside the vehicle. In feeding electric power in a non-contact manner, the alignment of an electric power transmission unit with an electric power reception unit poses a problem.

In the pamphlet of WO 2010/052785 (Patent Document 1), there is disclosed a non-contact charging system that aligns an electric power transmission coil and an electric power reception coil with each other on the basis of a situation of electric power reception.

RELATED ART DOCUMENTS

Patent Documents

Patent Document 1: Pamphlet of WO 2010/052785
Patent Document 2: Japanese Patent Application Publication No. 2010-183812 (JP-2010-183812 A)
Patent Document 3: Japanese Patent Application Publication No. 2010483804 (JP-2010-183804 A)

SUMMARY OF THE INVENTION

Problems to Be Solved by the Invention

In the non-contact charging system disclosed in the pamphlet of WO 2010/052785 (Patent Document 1), it is impossible to determine whether or not the positions of an electric power transmission portion including the electric power transmission coil and the like and an electric power reception portion including the electric power reception coil and the like enable appropriate electric power reception, unless an electric power reception operation is actually performed. In certain vehicles, it is possible to assume a case where the mounting position of the electric power reception portion differs to various degrees. At a certain mounting position of the electric power reception portion on the vehicle side, there is also conceived a case where an electric power transmission device side cannot cope with the vehicle. Besides, there is assumed a case where the installation position of the electric power transmission portion of the electric power transmission device also differs to various degrees. There is also conceived a case where the vehicle side cannot cope with the electric power transmission device either.

In such cases, it is inconvenient that a determination on the appropriateness of a positional relationship between the electric power transmission portion and the electric power reception portion cannot be made unless electric power is actually transmitted/received. Besides, even if electric power is actually transmitted/received to carry out a positional alignment, the position at which received electric power is at its local maximum may not be an optimal position.

It is an object of this invention to provide an electric power reception device, an electric power transmission device, and a non-contact electric power transmission/reception system for a vehicle that make it possible to obtain information on positions of an electric power transmission portion and an electric power reception portion without recourse to the transmission/reception of electric power.

Means for Solving the Problems

In summary, this invention is an electric power reception device for a vehicle that can receive electric power from an electric power transmission device outside the vehicle in a non-contact manner. The electric power reception device is equipped with an electric power reception unit that is configured to be able to receive electric power from the electric power transmission device in a non-contact manner, and a communication portion that transmits to the electric power transmission device information on a position or dimension of the electric power reception unit.

Preferably, the information includes at least of a size of the electric power reception unit, a size of the vehicle in which the electric power reception unit is mounted, a mounting position of the electric power reception unit in the vehicle, and a mounting angle of the electric power reception unit in the vehicle.

More preferably, the electric power reception device is further equipped with a control device that controls the communication portion. The control device receives from the electric power transmission device a determination result about whether or not non-contact charging is possible, on which a determination has been made on a basis of the information, and notifies a passenger of the determination result.

More preferably, the electric power reception device is further equipped with a control device that controls the communication portion. The control device receives from the electric power transmission device a determination result about a guidance direction of the vehicle on which a determination has been made on a basis of the information, and notifies a passenger of the determination result.

More preferably, the electric power transmission device includes a plurality of electric power transmission units. The electric power transmission device determines the electric power transmission unit used to transmit electric power among the plurality of the electric power transmission units, on a basis of the information transmitted from the communication portion.

More preferably, the electric power transmission device includes a movable electric power transmission unit. The electric power transmission device determines a position of the electric power transmission unit on a basis of the information transmitted from the communication portion.

In another aspect, this invention is an electric power transmission device that can transmit electric power in a non-contact manner. The electric power transmission device is equipped with an electric power transmission unit that is configured to be able to transmit electric power to a vehicle from outside the vehicle in a non-contact manner, and a communication portion that transmits information on a position or dimension of the electric power transmission unit to the vehicle.

Preferably, the information includes at least one of a size of the electric power transmission unit, a size of a parking space in which the electric power transmission unit is arranged, a mounting position of the electric power transmission unit in the parking space, and a mounting angle of the electric power transmission unit in the parking space.

More preferably, the electric power transmission device is further equipped with a control device that controls the communication portion. The control device receives from the vehicle a determination result about whether or not non-contact charging is possible on which a determination has been made on a basis of the information.

More preferably, the electric power transmission device is further equipped with a control device that controls the communication portion. The control device receives from the vehicle a determination result about a guidance direction of the vehicle on which a determination has been made on a basis of the information.

More preferably, the electric power transmission device is further equipped with a control device that controls the communication portion. The vehicle includes a plurality of electric power reception units. The control device transmits the information to the vehicle through use of the communication portion, in order to determine the electric power reception unit used to receive electric power among the plurality of the electric power reception units.

More preferably, the electric power transmission device is further equipped with a control device that controls the communication portion. The vehicle includes a movable electric power reception unit. The control device transmits the information to the vehicle through use of the communication portion, in order to determine a position of the electric power reception unit.

In still another aspect, this invention is an electric power transmission device that can transmit electric power to a vehicle in a non-contact manner. The vehicle includes an electric power reception unit that receives electric power from the electric power transmission device, and transmits information on a position or dimension of the electric power reception unit to the electric power transmission device. The electric power transmission device is equipped with a communication portion that receives the information on the position or dimension of the electric power reception unit from the vehicle, and an electric power transmission unit that is configured to be able to transmit electric power to the electric power reception unit in a non-contact manner.

In still another aspect, this invention is an electric power reception device for a vehicle that can receive electric power from an electric power transmission device in a non-contact manner. The electric power transmission device includes an electric power transmission unit that transmits electric power to the vehicle, and transmits information on a position or dimension of the electric power transmission unit to the electric power reception device for the vehicle. The electric power reception device for the vehicle is equipped with a communication portion that receives information on the position or dimension of the electric power transmission unit from the electric power transmission device, and an electric power reception unit that is configured to be able to receive electric power from the electric power transmission unit in a non-contact manner.

In still another aspect, this invention is a non-contact electric power transmission/reception system that is equipped with an electric power reception device that is mounted in a vehicle, and an electric power transmission device that is located outside the vehicle. The electric power reception device includes an electric power reception unit that is configured to be able to receive electric power from the electric power transmission device in a non-contact manner, and a communication portion that transmits information on a position or dimension of the electric power reception unit to the electric power transmission device.

In still another aspect, this invention is a non-contact electric power transmission/reception system that is equipped with an electric power reception device that is mounted in a vehicle, and an electric power transmission device that is located outside the vehicle. The electric power transmission device includes an electric power transmission unit that is configured to be able to transmit electric power to the vehicle from outside the vehicle in a non-contact manner, and a communication portion that transmits information on a position or dimension of the electric power transmission unit to the vehicle.

Effect of the Invention

According to the invention, the information on the position or dimension of the electric power transmission unit or the electric power reception unit can be recognized even if charging is actually not carried out, and an improvement in user-friendliness is achieved.

BRIEF DESCRIPTION OF THE DRAWINGS

FIG. 23 is a view for illustrating a first example in which communication is established according to a processing of FIG. 22.

FIG. 24 is a view for illustrating a second example in which communication is established according to the processing of FIG. 22.

MODES FOR CARRYING OUT THE INVENTION

Figure 1:
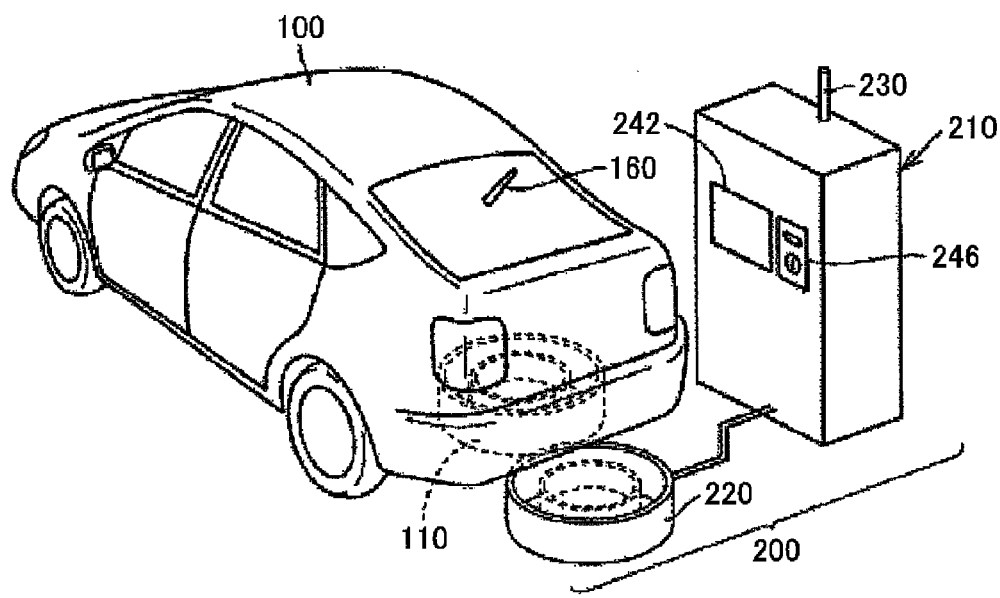
FIG. 1 is an overall configurational view of an electric power transmission/reception system according to each embodiment of this invention.

The embodiments of the invention will be described hereinafter in detail with reference to the drawings. Incidentally, like or equivalent components in the drawings are denoted by like reference symbols respectively, and the description thereof will not be repeated.

[Description of Outline of Non-contact Electric Power Transmission/Reception]

FIG. 1 is an overall configurational view of an electric power transmission/reception system according to each of the embodiments of this invention.

Referring to FIG. 1, an electric power transmission/reception system 10 includes a vehicle 100 and an electric power transmission device 200. The vehicle 100 includes an electric power reception unit 110 and a communication portion 160.

The electric power reception unit 110 is installed on a bottom face of a vehicle body, and is configured to receive electric power delivered from an electric power transmission unit 220 of the electric power transmission device 200, in a non-contact manner. More specifically, the electric power reception unit 110 includes a later-described self-resonant coil (referred to also as a resonant coil), and receives electric power from the electric power transmission unit 220 in a non-contact manner by resonating with the self-resonant coil included in the electric power transmission unit 220 via an electromagnetic field. The communication portion 160 is a communication interface for establishing communication between the vehicle 100 and the electric power transmission device 200.

The electric power transmission device 200 includes a charging stand 210 and the electric power transmission unit 220. The charging stand 210 includes a display portion 242, a fare reception portion 246, and a communication portion 230. The charging stand 210 converts, for example, a commercial alternating-current electric power into a high-frequency electric power, and outputs the high-frequency electric power to the electric power transmission unit 220. Incidentally, the charging stand 210 may be supplied with electric power from an electric power supply device such as a solar photovoltaic device, a wind generator device or the like.

The electric power transmission unit 220 is installed on, for example, a floor face of a parking lot, and is configured to deliver the high-frequency electric power supplied from the charging stand 210 to the electric power reception unit 110 of the vehicle 100 in a non-contact manner. More specifically, the electric power transmission unit 220 includes a self-resonant coil, and transmits electric power to the electric power reception unit 110 in a non-contact manner through resonance of this self-resonant coil with the self-resonant coil included in the electric power reception unit 110 via an electromagnetic field. The communication portion 230 is a communication interface for establishing communication between the electric power transmission device 200 and the vehicle 100.

It should be noted herein that in feeding electric power from the electric power transmission device 200 to the vehicle 100, there is a need to guide the vehicle 100 to the electric power transmission device 200, and align the electric power reception unit 110 of the vehicle 100 and the electric power transmission unit 220 of the electric power transmission device 200 with each other. That is, it is not easy to align the vehicle 100. A portable instrument can be lifted by a hand of a user and placed with ease at an appropriate position of an electric power feed unit such as a charger or the like. However, the vehicle needs to be operated by the user to be stopped at an appropriate position. The vehicle cannot be lifted by a hand to be adjusted in position.

For this reason, the adoption of a method with a high tolerance toward positional displacement is desirable in feeding electric power from the electric power transmission device 200 to the vehicle 100. An electromagnetic induction method is said to have a short transmission distance and a low tolerance toward positional displacement as well. If an attempt is made to adopt the electromagnetic induction method in feeding electric power to the vehicle, a highly accurate driving technique may be required of a driver during parking, the mounting of a highly accurate vehicle guidance device in the vehicle may become necessary, or a movable portion that moves a coil position such that a rough parking position can also be coped with may be required.

It is said that an electromagnetic field resonance method allows a relatively large electric power to be transmitted even if the transmission distance is several meters, and generally has a higher tolerance toward positional displacement than the electromagnetic induction method. Thus, in the electric power transmission/reception system 10 according to this embodiment of the invention, electric power is fed from the electric power transmission device 200 to the vehicle 100 through the use of a resonance technique.

Incidentally, in the electric power transmission/reception system according to this embodiment of the invention, the natural frequency of the electric power transmission unit and the natural frequency of the electric power reception unit are set equal to each other.

"The natural frequency of the electric power transmission unit" means an oscillation frequency in the case where an electric circuit including a capacitor and a coil of the electric power transmission unit freely oscillates. Incidentally, "the resonant frequency of the electric power transmission unit" means a natural frequency at the time when the braking force or electric resistance is set to zero in the electric circuit including the capacitor and the coil of the electric power transmission unit.

By the same token, "the natural frequency of the electric power reception unit" means an oscillation frequency in the case where an electric circuit including a capacitor and a coil of the electric power reception unit freely oscillates. Besides, "the resonant frequency of the electric power reception unit" means a natural frequency at the time when the braking force or electric resistance is set to zero in the electric circuit including the capacitor and the coil of the electric power reception unit.

In the present specification, "the same natural frequency" includes not only a case where the natural frequencies are completely equal to each other but also a case where the natural frequencies are substantially equal to each other. The sentence "the natural frequencies are substantially equal to each other" means a case where the difference between the natural frequency of the electric power transmission unit and the natural frequency of the electric power reception unit falls within 10% of the natural frequency of the electric power transmission unit or the natural frequency of the electric power reception unit.

Figure 2:
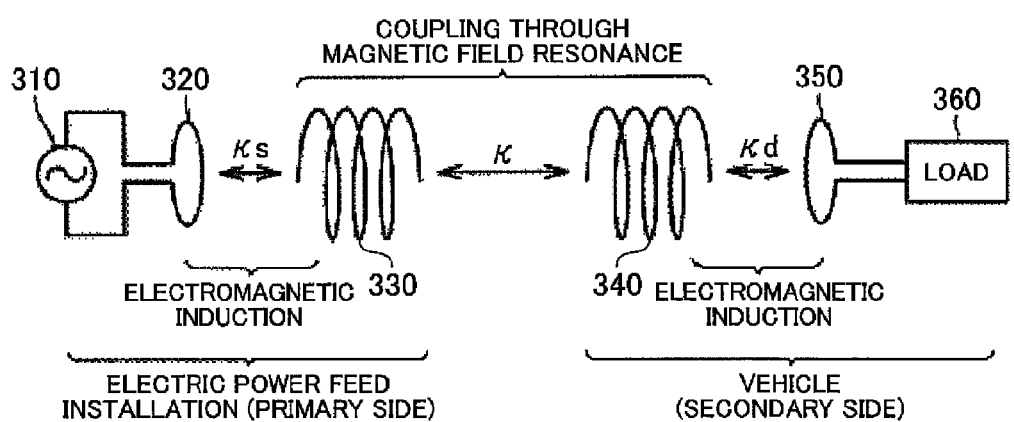
FIG. 2 is a view for illustrating a principle of electric power transmission according to a resonance technique.

FIG. 2 is a view for illustrating a principle of electric power transmission according to the resonance technique.

Referring to FIG. 2, in this resonance technique, two LC resonant coils having the same natural frequency resonate with each other in an electromagnetic field (a near field) as in the case where two tuning forks resonate with each other, so that electric power is transferred from one of the coils to the other coil via the electromagnetic field.

More specifically, a primary coil 320 is connected to a high-frequency electric power supply 310 to feed high-frequency electric power to a primary self-resonant coil 330 that is magnetically coupled to the primary coil 320 through electromagnetic induction. The primary self-resonant coil 330 is an LC resonator with a stray capacitance and an inductance of the coil itself, and resonates with a secondary self-resonant coil 340, which has the same resonant frequency as the primary self-resonant coil 330, via the electromagnetic field (the near field). Then, energy (electric power) moves from the primary self-resonant coil 330 to the secondary self-resonant coil 340 via the electromagnetic field. The energy (electric power) that has moved to the secondary self-resonant coil 340 is taken out by a secondary coil 350, which is magnetically coupled to the secondary self-resonant coil 340 through electromagnetic induction, and is supplied to a load 360. Incidentally, electric power transmission according to the resonance technique is realized when a Q-value indicating a resonance intensity of the primary self-resonant coil 330 and the secondary self-resonant coil 340 is larger than, for example, 100.

Besides, in the electric power transmission/reception system according to this embodiment of the invention, the electric power transmission unit and the electric power reception unit are caused to resonate (vibrate sympathetically) with each other through the electromagnetic field, so that electric power is transmitted from the electric power transmission unit to the electric power reception unit. It is preferable that a coupling coefficient (κ) between the electric power transmission unit and the electric power reception unit be equal to or smaller than 0.1. Incidentally, the coupling coefficient (κ) is not limited to this value, and can assume various values that ensure good electric power transfer. In general, in electric power transfer through the use of electromagnetic induction, the coupling coefficient (κ) between an electric power transmission portion and an electric power reception portion is close to 1.0.

Incidentally, as for a corresponding relationship with FIG. 1, the secondary self-resonant coil 340 and the secondary coil 350 correspond to the electric power reception unit 110 of FIG. 1, and the primary coil 320 and the primary self-resonant coil 330 correspond to the electric power transmission unit 220 of FIG. 1.

Figure 3:
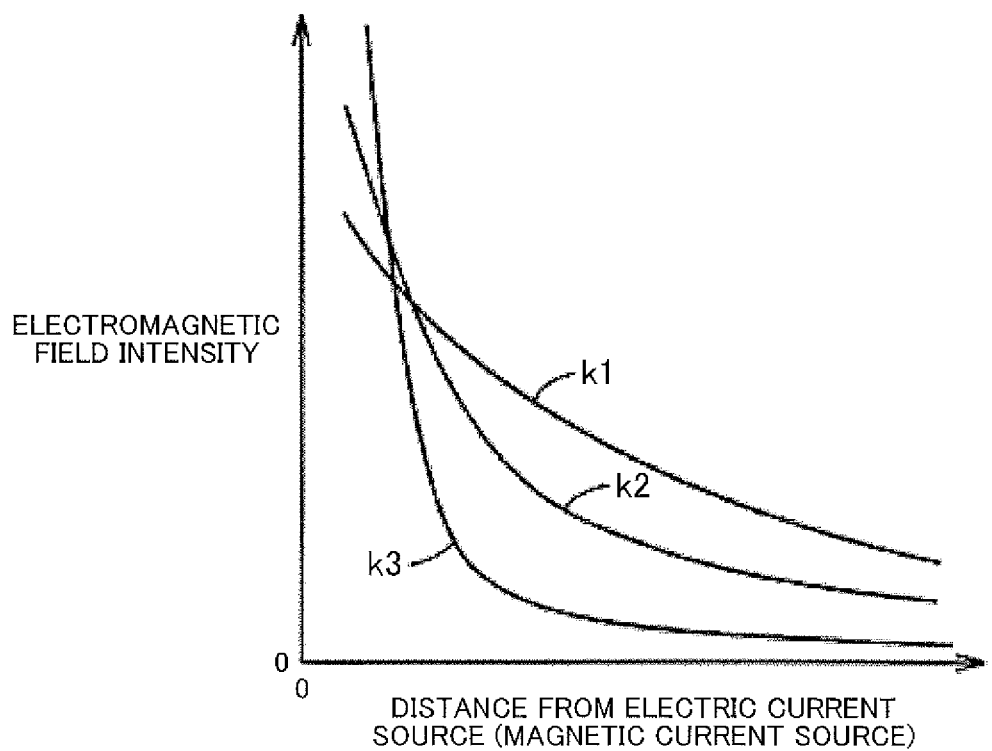
FIG. 3 is a view showing a relationship between a distance from an electric current source (a magnetic current source) and an intensity of an electromagnetic field.

FIG. 3 is a view showing a relationship between a distance from an electric current source (a magnetic current source) and an intensity of the electromagnetic field.

Referring to FIG. 3, the electromagnetic field includes three components. A curve k1 represents a component that is inversely proportional to the distance from a wave source, and is referred to as "a radiation electromagnetic field". A curve k2 represents a component that is inversely proportional to the square of the distance from the wave source, and is referred to as "an induction electromagnetic field". Besides, a curve k3 represents a component that is inversely proportional to the cube of the distance from the wave source, and is referred to as "an electrostatic electromagnetic field".

Among these electromagnetic fields, there is a region in which the intensity of electromagnetic waves suddenly decreases as the distance from the wave source increases. In the resonance technique, however, energy (electric power) is transferred through the use of this near field (an evanescent field). That is, a pair of resonators (e.g., a pair of LC resonant coils) having the same natural frequency are caused to resonate with each other through the use of the near field, so that energy (electric power) is transferred from one of the resonators (the primary self-resonant coil) to the other resonator (the secondary self-resonant coil). This near field does not propagate energy (electric power) over a long distance. Therefore, the resonance technique makes it possible to transmit electric power with a smaller energy loss than electromagnetic waves that transfer energy (electric power) through "the radiation electromagnetic field" that propagates energy over a long distance.

Figure 4:
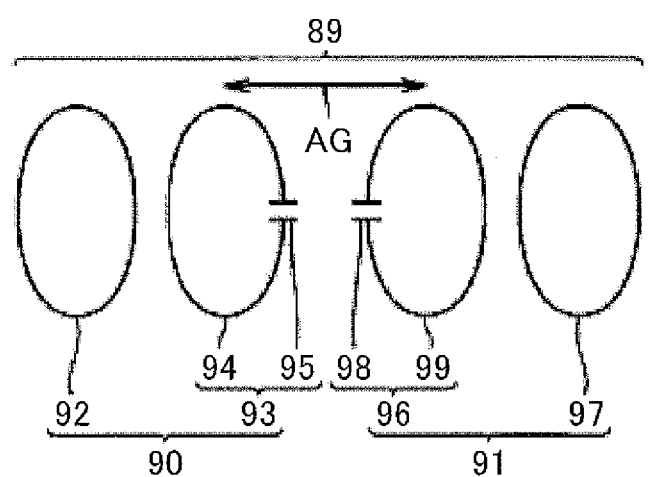
FIG. 4 is a view showing a simulation model of an electric power transfer system.
Figure 5:
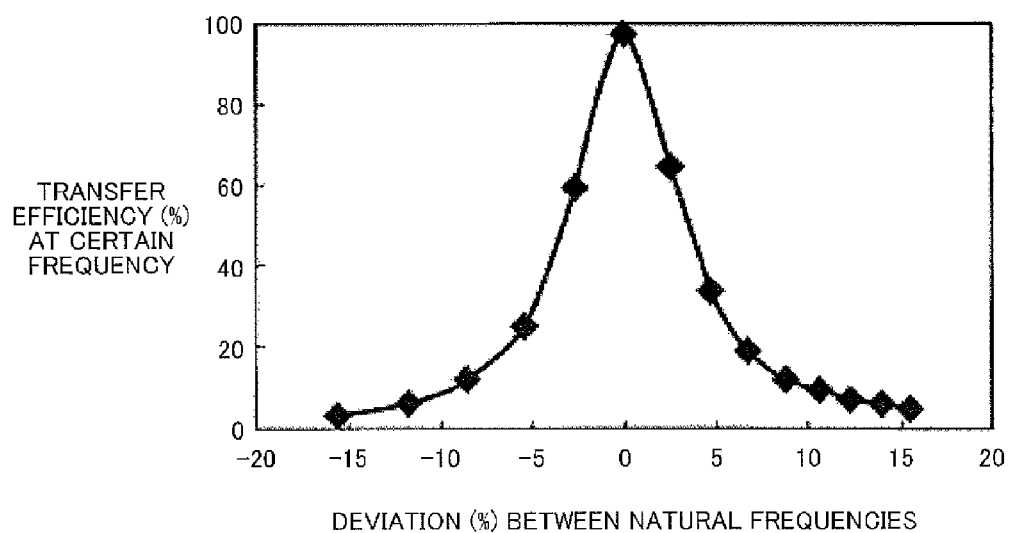
FIG. 5 is a view showing a relationship between a deviation between natural frequencies of an electric power transmission unit and an electric power reception unit, and an electric power transfer efficiency.

A simulation result of an analysis of a relationship between the difference between the natural frequencies and the efficiency of electric power transmission will be described using FIG. 4 and FIG. 5. FIG. 4 is a view showing a simulation model of an electric power transfer system. Besides, FIG. 5 is a view showing a relationship between a deviation between the natural frequencies of the electric power transmission unit and the electric power reception unit and the efficiency of electric power transfer.

Referring to FIG. 4, an electric power transfer system 89 includes an electric power transmission unit 90 and an electric power reception unit 91. The electric power transmission unit 90 includes a first coil 92 and a second coil 93. The second coil 93 includes a resonant coil 94 and a capacitor 95 that is connected to the resonant coil 94. The electric power reception unit 91 includes a third coil 96 and a fourth coil 97. The third coil 96 includes a resonant coil 99, and a capacitor 98 that is connected to this resonant coil 99.

It is assumed that the inductance of the resonant coil 94 is an inductance Lt, and that the capacitance of the capacitor 95 is a capacitance C1. Besides, it is assumed that the inductance of the resonant coil 99 is an inductance Lr, and that the capacitance of the capacitor 98 is a capacitance C2. If the respective parameters are thus set, a natural frequency f1 of the second coil 93 is indicated by an expression (1) shown below, and a natural frequency f2 of the third coil 96 is indicated by an expression (2) shown below.

$$f1=1/\{2\pi(Lt \times C1)^{1/2}\} \quad (1)$$

$$f2=1/\{2\pi(Lr \times C2)^{1/2}\} \quad (2)$$

It should be noted herein that FIG. 5 shows a relationship between a deviation between the natural frequencies of the second coil 93 and the third coil 96 and the efficiency of electric power transfer in the case where only the inductance Lt is changed with the inductance Lr and the capacitances C1 and C2 fixed. Incidentally, in this simulation, the mutual positional relationship between the resonant coil 94 and the resonant coil 99 is fixed, and furthermore, the frequency of the current supplied to the second coil 93 is constant.

In the graph shown in FIG. 5, an axis of abscissa represents a deviation between the natural frequencies (%), and an axis of ordinate represents the efficiency (%) of electric power transfer. The deviation (%) between the natural frequencies is indicated by an expression (3) shown below.

$$\text{(Deviation between Natural Frequencies)}=\{(f1-f2)/f2\}\times100(\%) \quad (3)$$

As is also apparent from FIG. 5, the efficiency of electric power transfer is close to 100% in the case where the deviation (%) between the natural frequencies is 0%. The efficiency of electric power transfer is about 40% in the case where the deviation (%) between the natural frequencies is ±5%. The efficiency of electric power transfer is about 10% in the case where the deviation (%) between the natural frequencies is ±10%. The efficiency of electric power transfer is about 5% in the case where the deviation (%) between the natural frequencies is ±15%. That is, it is apparent that the efficiency of electric power transfer can be enhanced to a practical level by setting the natural frequencies of the second coil 93 and the third coil 96 such that the absolute value of the deviation (%) between the natural frequencies (the difference between the natural frequencies) falls within a range equal to or lower than 10% of the natural frequency of the third coil 96. Furthermore, it is more preferable to set the natural frequencies of the second coil 93 and the third coil 96 such that the absolute value of the deviation (%) between the natural frequencies becomes equal to or lower than 5% of the natural frequency of the third coil 96, because the efficiency of electric power transfer can further be enhanced. Incidentally, electromagnetic analysis software (JMAG (registered trademark): manufactured by JSOL Inc.) is adopted as simulation software.

[Detailed Description of Configuration of Non-Contact Electric Power Transmission/Reception]

Figure 6:
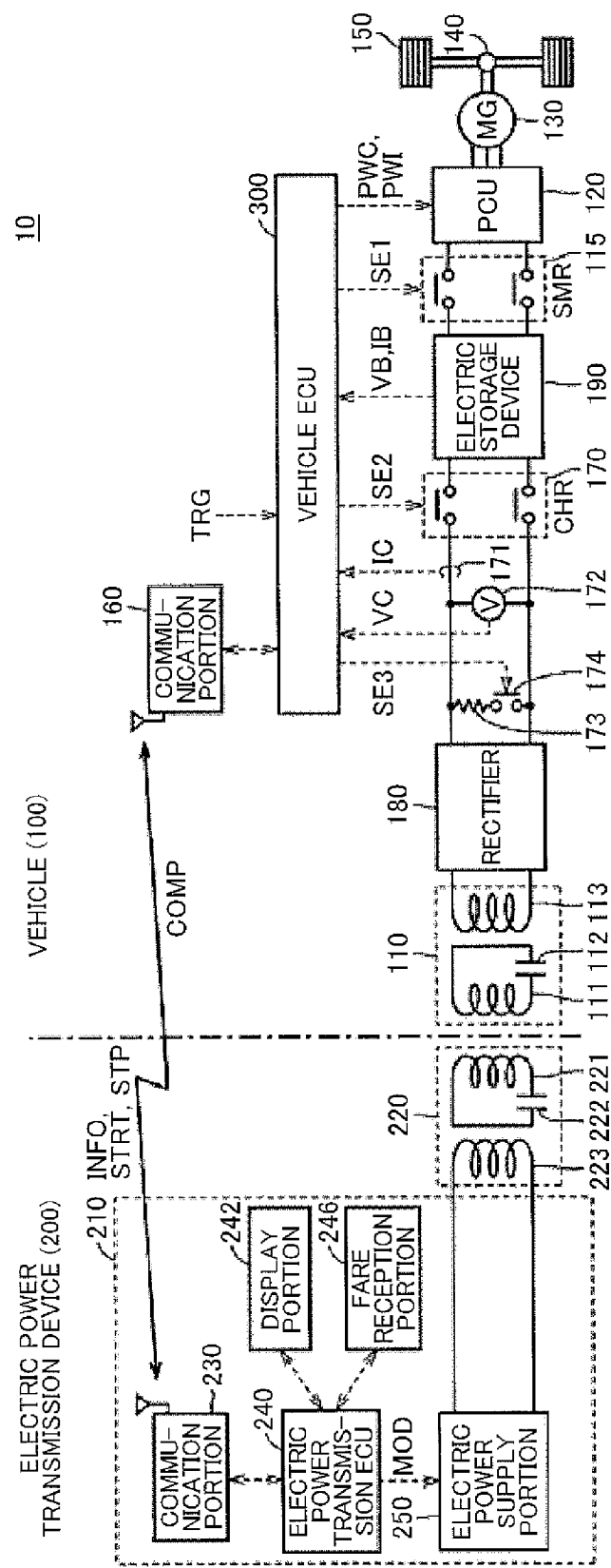
FIG. 6 is a detailed configurational view of the electric power transmission/reception system shown in FIG. 1.

FIG. 6 is a detailed configurational view of the electric power transmission/reception system 10 shown in FIG. 1. Referring to FIG. 6, the vehicle 100 includes a rectifier 180, a charging relay (a CHR) 170, an electric storage device 190, a system main relay (an SMR) 115, a power control unit (a PCU) 120, a motor-generator 130, a motive power transmission gear 140, driving wheels 150, a vehicle electronic control unit (a vehicle ECU) 300 as a control device, a current sensor 171, and a voltage sensor 172, in addition to the electric power reception unit 110 and the communication portion 160. The electric power reception unit 110 includes a secondary self-resonant coil 111, a condenser 112, and a secondary coil 113.

Incidentally, in this embodiment of the invention, an electric vehicle will be described as an example of the vehicle 100. However, the configuration of the vehicle 100 is not limited to this electric vehicle as long as the vehicle 100 can run through the use of an electric power stored in an electric storage device. Other examples of the vehicle 100 include a hybrid vehicle that is mounted with an engine, a fuel cell vehicle that is mounted with a fuel cell, and the like.

The secondary self-resonant coil 111 receives electric power from the primary self-resonant coil 221 included in the electric power transmission device 200, through electromagnetic resonance with the aid of an electromagnetic field.

As for this secondary self-resonant coil 111, the number of windings of the secondary self-resonant coil 111 and the distance between the coils of the primary self-resonant resonant coil 221 and the secondary self-resonant coil 111 are appropriately set such that the Q-value indicating the resonance intensity between the primary self-resonant resonant coil 221 and the secondary self-resonant coil 111 becomes large (e.g., Q>100) and that the coupling coefficient (κ) indicating the degree of coupling therebetween or the like becomes small (e.g., equal to or smaller than 0.1), on the basis of a distance from the primary self-resonant coil 221 of the electric power transmission device 200, resonant frequencies of the primary self-resonant coil 221 and the secondary self-resonant coil 111, and the like.

The condenser 112 is connected to both ends of the secondary self-resonant coil 111, and forms an LC resonant circuit together with the secondary self-resonant coil 111. The capacity of the condenser 112 is appropriately set such that a predetermined resonant frequency is obtained in accordance with an inductance of the secondary self-resonant coil 111. Incidentally, the condenser 112 may be omitted if a desired resonant frequency is obtained with a stray capacitance of the secondary self-resonant coil 111 itself.

The secondary coil 113 is provided coaxially with the secondary self-resonant coil 111, and can be magnetically coupled to the secondary self-resonant coil 111 through electromagnetic induction. This secondary coil 113 takes out an electric power received by the secondary self-resonant coil 111, through electromagnetic induction, and outputs the electric power to the rectifier 180.

The rectifier 180 rectifies an alternating-current electric power received from the secondary coil 113, and outputs the rectified direct-current electric power to the electric storage device 190 via the CHR 170. The rectifier 180 can be configured to include, for example, a diode bridge (not shown) and a smoothing condenser (not shown). As the rectifier 180, it is also possible to use a so-called switching regulator that carries out rectification with the aid of switching control. However, there are also cases where the rectifier 180 is included in the electric power reception unit 110. A static rectifier such as a diode bridge is more preferable in order to prevent a switching element from malfunctioning etc. due to a generated electromagnetic field.

Incidentally, this embodiment of the invention adopts a configuration in which the direct-current electric power rectified by the rectifier 180 is directly output to the electric storage device 190. However, in the case where a direct-current voltage after rectification is different from a charging voltage permissible by the electric storage device 190, a DC/DC converter (not shown) for carrying out voltage conversion may be provided between the rectifier 180 and the electric storage device 190.

A load resistor 173 and a relay 174, which are connected in series to each other to detect a position, are connected to an output region of the rectifier 180. Before full-scale charging is started, feeble electric power is transmitted from the electric power transmission device 200 to the vehicle as a test signal. At this time, the relay 174 is controlled to be made conductive by a control signal SE3 from the vehicle ECU 300.

The voltage sensor 172 is provided between a pair of electric power lines that couple the rectifier 180 and the electric storage device 190 to each other. The voltage sensor 172 detects a direct-current voltage on the secondary side of the rectifier 180, namely, a voltage received from the electric power transmission device 200, and outputs a detected value VC thereof to the vehicle ECU 300. The vehicle ECU 300 makes a determination on an efficiency of electric power reception in accordance with the voltage VC, and transmits information on the efficiency of electric power reception to the electric power transmission device via the communication portion 160.

The current sensor 171 is provided on an electric power line that couples the rectifier 180 and the electric storage device 190 to each other. The current sensor 171 detects a charging current to the electric storage device 190, and outputs a detected value IC thereof to the vehicle ECU 300.

The CHR 170 is electrically connected to the rectifier 180 and the electric storage device 190. The CHR 170 is controlled by a control signal SE2 from the vehicle ECU 300, and makes a changeover between the supply of electric power from the rectifier 180 to the electric storage device 190 and the shutoff of the supply of electric power from the rectifier 180 to the electric storage device 190.

The electric storage device 190 is an electric power storage element that is configured to be chargeable/dischargeable. The electric storage device 190 is configured to include, for example, a secondary battery such as a lithium-ion battery, a nickel hydride battery, a lead storage battery or the like, and an electric storage element such as an electric double layer capacitor or the like.

The electric storage device 190 is connected to the rectifier 180 via the CHR 170. The electric storage device 190 stores an electric power that is received by the electric power reception unit 110 and rectified by the rectifier 180. Besides, the electric storage device 190 is connected to the PCU 120 as well via the SMR 115. The electric storage device 190 supplies the PCU 120 with an electric power for generating a vehicle driving force. Furthermore, the electric storage device 190 stores the electric power generated by the motor-generator 130. The output of the electric storage device 190 is, for example, about 200 V.

The electric storage device 190 is provided with a voltage sensor (not shown) for detecting a voltage VB of the electric storage device 190 and a current sensor (not shown) for detecting an input/output current IB. These detected values are output to the vehicle ECU 300. The vehicle ECU 300 calculates a state of charge (referred to also as an SOC) of the electric storage device 190 on the basis of this voltage VB and this current IB.

The SMR 115 is interposed on an electric power line that couples the electric storage device 190 and the PCU 120 to each other. Then, the SMR 115 is controlled by a control signal SE1 from the vehicle ECU 300, and makes a changeover between the supply of electric power and the shutoff of the supply of electric power between the electric storage device 190 and the PCU 120.

The PCU 120 includes a converter (not shown) and an inverter (not shown). The converter is controlled by a control signal PWC from the vehicle ECU 300, and converts a voltage from the electric storage device 190. The inverter is controlled by a control signal PWI from the vehicle ECU 300, and drives the motor-generator 130 with the aid of the electric power converted by the converter.

The motor-generator 130 is an alternating-current rotating electrical machine, and for example, is a permanent magnet-type synchronous motor that is equipped with a rotor in which a permanent magnet is embedded.

An output torque of the motor-generator 130 is transmitted to the driving wheels 150 via the motive power transmission gear 140 to cause the vehicle 100 to run. During regenerative braking operation of the vehicle 100, the motor-generator 130 can generate an electric power through a rotating force of the driving wheels 150. Then, the generated electric power is converted into a charging electric power of the electric storage device 190 by the PCU 120.

Besides, in a hybrid vehicle that is mounted with an engine (not shown) in addition to the motor-generator 130, this engine and this motor-generator 130 are operated in a cooperative manner, so that a required vehicle driving force is generated. In this case, it is also possible to charge the electric storage device 190 with the aid of the electric power generated through rotation of the engine.

The communication portion 160 is a communication interface for establishing radio communication between the vehicle 100 and the electric power transmission device 200 as described above. The communication portion 160 outputs battery information INFO, which originates from the vehicle ECU 300 and includes the SOC of the electric storage device 190, to the electric power transmission device 200. Besides, the communication portion 160 outputs to the electric power transmission device 200 signals STRT and STP commanding the start and stop of electric power transmission from the electric power transmission device 200 respectively.

Although not shown in FIG. 1, the vehicle ECU 300 includes a central processing unit (a CPU), a storage device, and an input/output buffer. Signals from respective sensors and the like are input to the vehicle ECU 300, and the vehicle ECU 300 outputs control signals to respective instruments to control the vehicle 100 and the respective instruments. Incidentally, the control of these instruments is not absolutely required to be performed by software, but can also be performed by dedicated hardware (an electronic circuit).

Upon receiving a charging start signal TRG resulting from an operation by a user or the like, the vehicle ECU 300 outputs the signal STRT indicating the start of electric power transmission to the electric power transmission device 200 via the communication portion 160, on the basis of the fulfillment of a predetermined condition. Besides, the vehicle ECU 300 outputs the signal STP indicating the stop of electric power transmission to the electric power transmission device 200 via the communication portion 160, on the basis of a state where the electric storage device 190 is fully charged or an operation by the user or the like.

The electric power transmission device 200 includes a charging stand 210 and an electric power transmission unit 220. In addition to the communication portion 230, the charging stand 210 further includes an electric power transmission ECU 240 as a control device, an electric power supply portion 250, a display portion 242, and a fare reception portion 246. Besides, the electric power transmission unit 220 includes a primary self-resonant coil 221, a condenser 222, and a primary coil 223.

The electric power supply portion 250 is controlled by a control signal MOD from the electric power transmission ECU 240, and converts an electric power received from an alternating-current electric power supply such as a commercial electric power supply or the like into a high-frequency electric power. Then, the electric power supply portion 250 supplies the primary coil 223 with the high-frequency electric power obtained as a result of conversion.

Incidentally, a matching box that carries out impedance conversion is not described in FIG. 6. However, it is also appropriate to adopt a configuration in which a matching box is provided between the electric power supply portion 250 and the electric power transmission unit 220 or between the electric power reception unit 110 and the rectifier 180.

The primary self-resonant coil 221 forwards electric power to the secondary self-resonant coil 111 included in the electric power reception unit 110 of the vehicle 100, through electromagnetic resonance.

As for the primary self-resonant coil 221, the number of windings of the primary self-resonant coil 221 and the distance between the coils of the primary self-resonant coil 221 and the secondary self-resonant coil 111 of the vehicle 100 are appropriately set such that the Q-value indicating the resonance intensity between the primary self-resonant coil 221 and the secondary self-resonant coil 111 becomes large (e.g., Q>100) and that the value κ indicating the degree of coupling therebetween or the like becomes small (e.g., equal to or smaller than 0.1), on the basis of the distance from the secondary self-resonant coil 111 of the vehicle 100, the resonant frequencies of the primary self-resonant coil 221 and the secondary self-resonant coil 111, and the like.

The condenser 222 is connected to both ends of the primary self-resonant coil 221, and forms an LC resonant circuit together with the primary self-resonant coil 221. The capacity of the condenser 222 is appropriately set such that a predetermined resonant frequency is obtained, in accordance with the inductance of the primary self-resonant coil 221. Incidentally, if a desired resonant frequency is obtained with a stray capacitance of the primary self-resonant coil 221 itself, the condenser 222 may be omitted.

The primary coil 223 is provided coaxially with the primary self-resonant coil 221, and can be magnetically coupled to the primary self-resonant coil 221 through electromagnetic induction. The primary coil 223 transmits to the primary self-resonant coil 221 a high-frequency electric power supplied via a matching box 260, through electromagnetic induction.

As described above, the communication portion 230 is a communication interface for establishing radio communication between the electric power transmission device 200 and the vehicle 100. The communication portion 230 receives the battery information INFO transmitted from the communication portion 160 on the vehicle 100 side, and the signals STRT and STP commanding the start and stop of electric power transmission, and outputs these pieces of information to the electric power transmission ECU 240.

Cash, a prepaid card, a credit card or the like is inserted into the fare reception portion 246 prior to charging. The electric power transmission ECU 240 causes the electric power supply portion 250 to transmit a test signal resulting from a feeble electric power. It should be noted herein that "the feeble electric power" may also include an electric power that is smaller than a charging electric power with which the battery is charged after authentication, or an electric power that is transmitted at the time of alignment and is intermittently transmitted.

The vehicle ECU 300 turns the relay 174 on to receive a test signal, and transmits control signals SE2 and SE3 to turn the CHR 170 off. The vehicle ECU 300 then calculates an efficiency of electric power reception and a charging efficiency on the basis of the voltage VC. The vehicle ECU 300 transmits the calculated charging efficiency or the calculated efficiency of electric power reception to the electric power transmission device 200 with the aid of the communication portion 160.

The display portion 242 of the electric power transmission device 200 displays to the user the charging efficiency and a charging electric power unit price corresponding thereto. The display portion 242 also has a function as an input portion, for example, a touch panel, and can accept an input indicating whether or not the user approves the charging electric power unit price.

In the case where the charging electric power unit price is approved, the electric power transmission ECU 240 causes the electric power supply portion 250 to start full-scale charging. If charging is completed, a fare adjustment is made in the fare reception portion 246.

Although not shown in FIG. 1, the electric power transmission ECU 240 includes a CPU, a storage device, and an input/output buffer. Signals from the respective sensors and the like are input to the electric power transmission ECU 240, and the electric power transmission ECU 240 outputs control signals to the respective instruments to control the respective instruments in the charging stand 210. Incidentally, the control of these instruments is not absolutely required to be performed by software, but can also be performed by dedicated hardware (an electronic circuit).

Incidentally, as for the transfer of electric power from the electric power transmission device 200 to the vehicle 100, there is established a relationship as to the electric power transmission unit 90 and the electric power reception unit 91 as described with reference to FIGS. 4 and 5. In the electric power transfer system of FIG. 6, the difference between the natural frequency of the electric power transmission unit 220 and the natural frequency of the electric power reception unit 110 is equal to or smaller than ±10% of the natural frequency of the electric power transmission unit 220 or the natural frequency of the electric power reception unit 110. The electric power transfer efficiency can be enhanced by setting the natural frequencies of the electric power transmission unit 220 and the electric power reception unit 110 within such a range. On the other hand, if the aforementioned difference between the natural frequencies becomes larger than ±10%, the efficiency of electric power transfer becomes lower than 10%, and an inconvenience such as an increase in the time of electric power transfer or the like is caused.

Incidentally, the natural frequency of the electric power transmission unit 220 (the electric power reception unit 110) means an oscillation frequency in the case where an electric circuit (a resonant circuit) that constitutes the electric power transmission unit 220 (the electric power reception unit 110) freely oscillates. Incidentally, in the electric circuit (the resonant circuit) that constitutes the electric power transmission unit 220 (the electric power reception unit 110), the natural frequency at the time when the braking force or electric resistance is set to zero is also referred to as the resonant frequency of the electric power transmission unit 220 (the electric power reception unit 110).

The electric power transmission unit 220 and the electric power reception unit 110 give and receive electric power in a non-contact manner through at least one of a magnetic field that is formed between the electric power transmission unit 220 and the electric power reception unit 110 and oscillates at a specific frequency and an electric field that is formed between the electric power transmission unit 220 and the electric power reception unit 110 and oscillates at a specific frequency. The coupling coefficient κ between the electric power transmission unit 220 and the electric power reception unit 110 is equal to or smaller than 0.1. Electric power is transferred from the electric power transmission unit 220 to the electric power reception unit 110 by causing the electric power transmission unit 220 and the electric power reception unit 110 to resonate (vibrate sympathetically) with each other through an electromagnetic field.

[Review of Arrangement of Electric Power Transmission/Reception Units]

Figure 7:
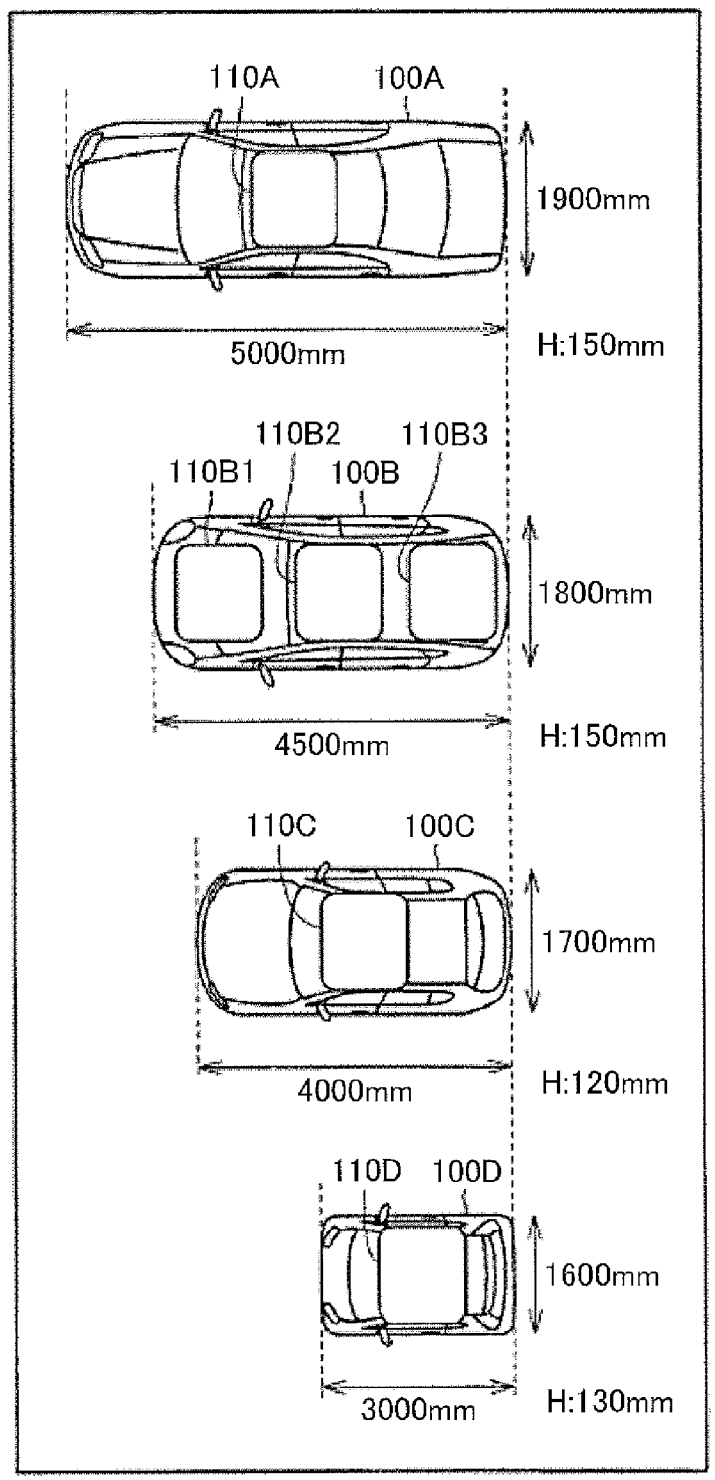
FIG. 7 is a view for illustrating the arrangement of the electric power reception unit in various vehicles.

FIG. 7 is a view for illustrating the arrangement of the electric power reception unit in various vehicles. FIG. 7 shows examples of four vehicles.

A vehicle 100A is a vehicle that is the largest in size among the four vehicles. The vehicle 100A has a total length of 5000 mm and a total width of 1900 mm, and an electric power reception unit 110A is installed on a lower portion of a central floor face of the vehicle. A lower face of the electric power reception unit 110A has a height of 150 mm above the ground.

A vehicle 100B is the second largest in size among the four vehicles. The vehicle 100B has a total length of 4500 mm and a total width of 1800 mm. The vehicle 100B is mounted with three electric power reception units 110B1 to 110B3. The electric power reception unit 110B1 is installed on a lower portion of a front floor face of the vehicle. The electric power reception unit 110B2 is installed on a lower portion of a central floor face of the vehicle. The electric power reception unit 110B3 is installed on a lower portion of a rear floor face of the vehicle. Lower faces of the electric power reception units 110B1 to 110B3 have a height of 150 mm above the ground. Incidentally, the vehicle 100B may be mounted with one of the electric power reception units 110B1 to 110B3.

A vehicle 100C is the third largest in size among the four vehicles. The vehicle 100C has a total length of 4000 mm and a total width of 1700 mm, and an electric power reception unit 110C is installed on a lower portion of a central floor face of the vehicle. A lower face of the electric power reception unit 110C has a height of 120 mm above the ground.

A vehicle 100D is the smallest in size among the four vehicles. The vehicle 100D has a total length of 3000 mm and a total width of 1600 mm, and an electric power reception unit 110D is installed on a lower portion of a central floor face of the vehicle. A lower face of the electric power reception unit 110D has a height of 130 mm above the ground.

In this manner, there is assumed a case where the arrangement of each of the electric power reception units in each of the vehicles also differs depending on each of the vehicles.

In order to define the position of each of the electric power reception units in each of the vehicles, for example, the following data 1) to 6) are required:

1) a distance (mm) from a rear axle to the center of gravity (or the center) of each of the electric power reception units;

2) a distance (mm) from a front axle to the center of gravity (or the center) of each of the electric power reception units;

3) distances (mm) of deviations from the center of gravity (or the center) of each of the electric power reception units and the center of the vehicle;

4) (longitudinal and lateral) sizes (mm) of each of the electric power reception units;

5) (longitudinal and lateral) sizes (mm) of each of the vehicles; and 6) a height (mm) of the lower face of each of the electric power reception units above the ground.

Incidentally, the center of gravity of each of the electric power reception units means the center of gravity of the contour of a unit that is projected onto a plane. Besides, in the present specification, the center of a unit means the center of a circle if the unit is circular in shape, and means the center of an inscribed circle or a circumscribed circle of a polygon if the unit is polygonal in shape. Besides, in addition to the center of gravity or the center, any piece of information that allows the position of the unit to be specified, for example, the position of an end of the unit or the like can be used instead.

Figure 8:
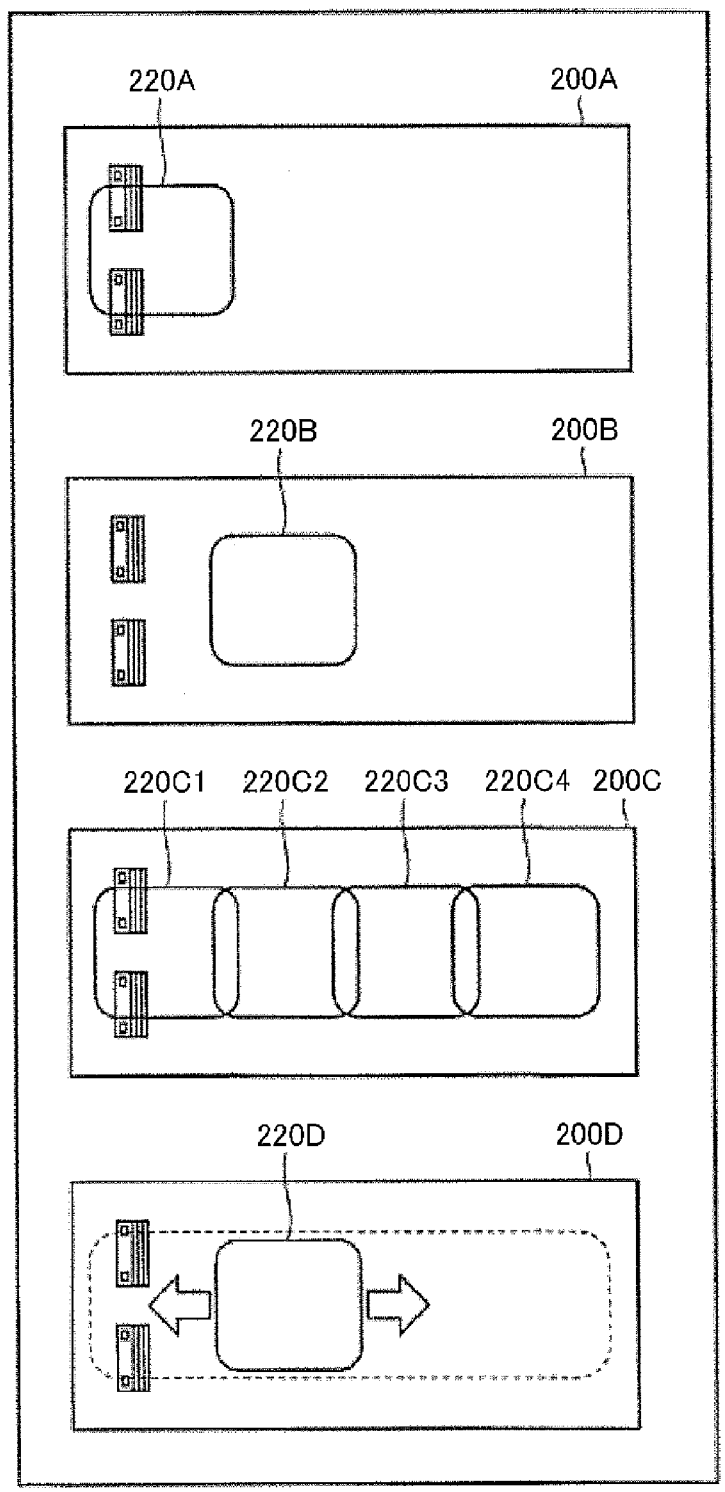
FIG. 8 is a view for illustrating the arrangement of the electric power transmission unit in various electric power transmission devices.

FIG. 8 is a view for illustrating the arrangement of each of the electric power transmission units in various electric power transmission devices. FIG. 8 shows examples of four electric power transmission devices.

In an electric power transmission device 200A, an electric power transmission unit 220A is arranged in the vicinity of car stops (wheel stoppers). In an electric power transmission device 200B, the electric power transmission unit 220B is arranged at a position spaced apart from car stops (wheel stoppers) toward the center of a parking space.

In an electric power transmission device 200C, electric power transmission units 220C1 to 220C4 are arranged offset in position from one another sequentially from the vicinity of car stops (wheel stoppers). In an electric power transmission device 200D, an electric power transmission unit 220D that can, be moved along a moving direction of a vehicle is arranged.

In this manner, there is assumed a case where the arrangement of each of the electric power transmission units in each of the electric power transmission devices also differs depending on each of the electric power transmission devices.

In order to define the position of each of the electric power transmission units in each of the electric power transmission devices, for example, the following data 11) to 16) are required:

11) a distance (mm) from front ends of the wheel stoppers to the center of gravity (or the center) of each of the electric power transmission units;

12) distances (mm) of deviations from the center of gravity (or the center) of each of the electric power transmission units and the center of the parking space;

13) (longitudinal and lateral) sizes (mm) of each of the electric power transmission units;

14) (longitudinal and lateral) sizes (mm) of the parking space;

15) a distance (mm) from the center of gravity (or the center) of the parking space to the front ends of the wheel stoppers; and 16) a height (mm) of an upper face of each of the electric power transmission units above the ground.

Incidentally, the center of gravity of each of the electric power transmission units means the center of gravity of the contour of a unit that is projected onto a plane. Besides, in the present specification, the center of a unit means the center of a circle if the unit is circular in shape, and means the center of an inscribed circle or a circumscribed circle of a polygon if the unit is polygonal in shape. Besides, in addition to the center of gravity or the center, any piece of information that allows the position of the unit to be specified, for example, the position of an end of the unit or the like can be used instead.

First Embodiment

Figure 9:
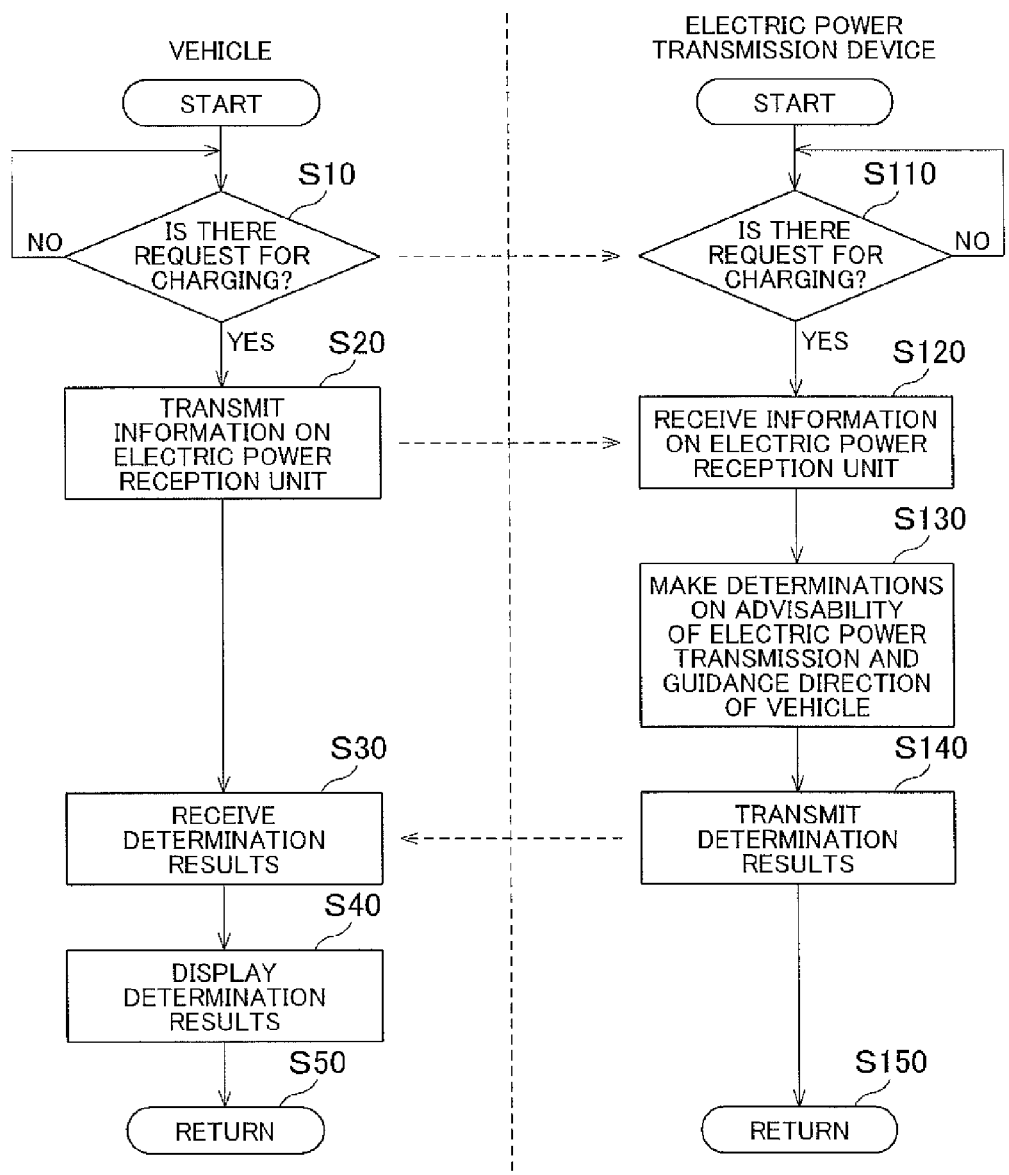
FIG. 9 is a flowchart for illustrating the control performed in the vehicle and the electric power transmission device in the first embodiment of the invention.

FIG. 9 is a flowchart for illustrating the control performed in the vehicle and the electric power transmission device in the first embodiment of the invention.

Referring to FIG. 6 and FIG. 9, in the vehicle 100, in step S10, the vehicle ECU 300 monitors whether or not there is a request for charging. If it is determined that the charging start signal TRG has been input through an operation by a user or the like, the vehicle ECU 300 transmits to the electric power transmission device 200 a message indicating that there is a request for charging, via the communication portion 160. Then, the processing proceeds from step S10 to step S20.

On the other hand, in the electric power transmission device 200, in step S110, the electric power transmission ECU 240 monitors whether or not there is a request for charging. If a message indicating that a request for charging has been made is transmitted from the communication portion 160 of the vehicle 100 and the electric power transmission ECU 240 detects the request for charging via the communication portion 230, the processing proceeds from step S110 to step S120.

In the vehicle 100, in step S20, information on the electric power reception unit 110 is transmitted toward the electric power transmission device 200 by the communication portion 160. In the electric power transmission device 200, in step S120, information on the electric power reception unit 110 is received by the communication portion 230.

In step S130, in the electric power transmission device 200, the electric power transmission ECU 240 makes determinations on whether or not electric power transmission is possible, and a guidance direction of the vehicle. Then, in step S140, the electric power transmission ECU 240 transmits determination results toward the vehicle 100 via the communication portion 230.

In the vehicle 100, the determination results are received by the communication portion 160 in step S30, and the vehicle ECU 300 causes a display portion such as a liquid crystal display (not shown) or the like to display the determination results. Incidentally, a driver may be acoustically notified of the determination results, instead of causing the display portion to display the determination results.

If the aforementioned processing ends, the processing returns to a main routine of the vehicle and the electric power transmission device in step S50 and step S150.

Figure 10:
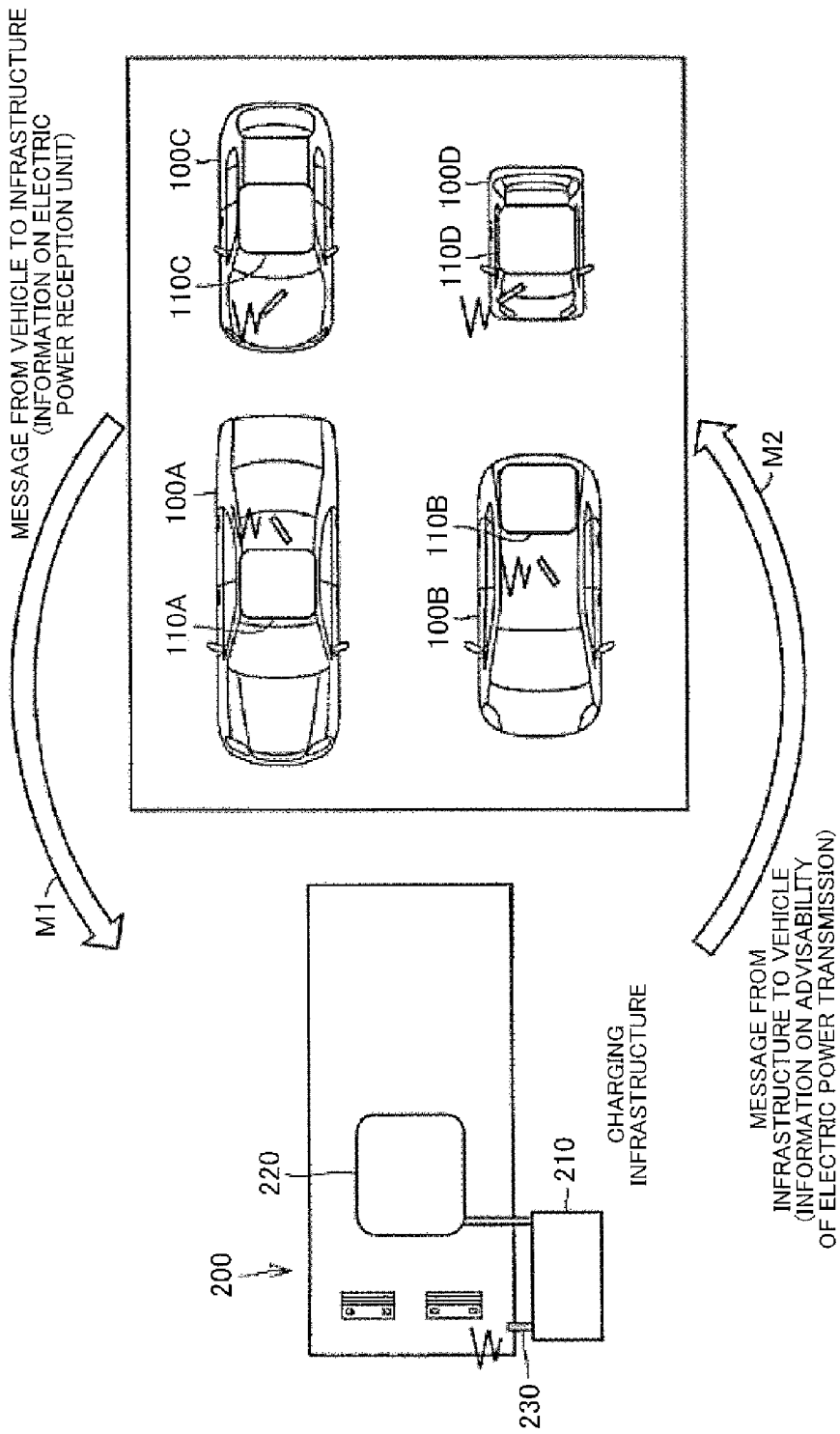
FIG. 10 is a view for illustrating a first example in which communication is established according to a processing of FIG. 9.

FIG. 10 is a view for illustrating a first example in which communication is established in accordance with the processing of FIG. 9. Referring to FIG. 9 and FIG. 10, in step S20 and step S120, a message M1 from the vehicle to the electric power transmission device is transmitted. The message M1 includes information associated with the electric power reception unit 110 of the vehicle.

Figure 11:
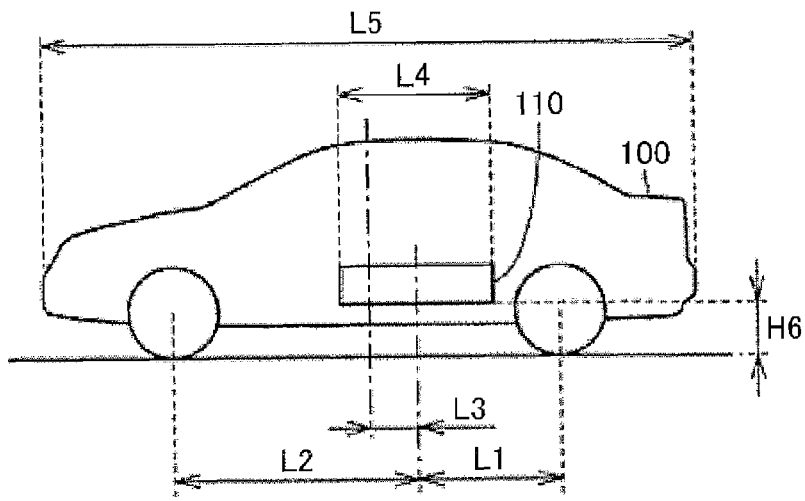
FIG. 11 is a lateral view for illustrating information associated with the electric power reception unit of the vehicle.
Figure 12:
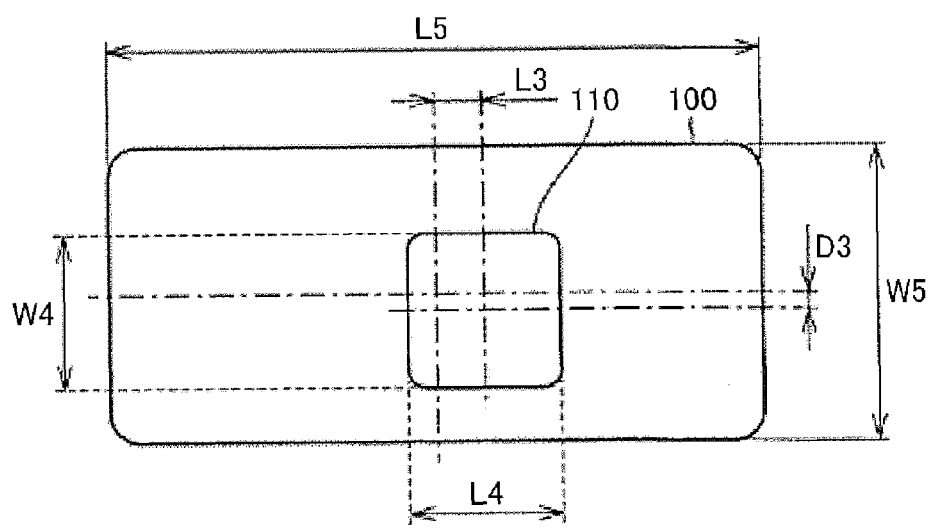
FIG. 12 is a top view for illustrating information associated with the electric power reception unit of the vehicle.

FIG. 11 is a lateral view for illustrating information associated with the electric power reception unit of the vehicle. FIG. 12 is a top view for illustrating information associated with the electric power reception unit of the vehicle.

The information associated with the position or dimension of the electric power reception unit of the vehicle, which is included in the message M1, includes the following data 1) to 6). Incidentally, the following is an exemplification. Any piece of information indicating the position or dimension of the electric power reception unit of the vehicle or any piece of information utilized to indirectly obtain these values may be adopted.

1) a distance L1 (mm) from the rear axle to the center of gravity (or the center) of the electric power reception unit;

2) a distance L2 (mm) from the front axle to the center of gravity (or the center) of the electric power reception unit;

3) distances L3 and D3 (mm) of deviations from the center of gravity (or the center) of the electric power reception unit and the center of the vehicle;

4) (longitudinal and lateral) sizes L4 and W4 (mm) of the electric power reception unit;

5) (longitudinal and lateral) sizes L5 and W5 (mm) of the vehicle; and 6) a height 116 (mm) of the lower face of the electric power reception unit above the ground.

Incidentally, the center of gravity of the electric power reception unit means the center of gravity of the contour of a unit that is projected onto a plane. Besides, in the present specification, the center of a unit means the center of a circle if the unit is circular in shape, and means the center of an inscribed circle or a circumscribed circle of a polygon if the unit is polygonal in shape. Besides, in addition to the center of gravity or the center, any piece of information that allows the position of the unit to be specified, for example, the position of an end of the unit or the like can be used instead. Besides, in the case where the unit has directivity or the like, a mounting angle may be included in the aforementioned information. It should be noted herein that the mounting angle means, for example, a rotational angle of the unit with respect to a longitudinal direction of the vehicle.

"The information on the position or dimension of the unit" can also include a size of the vehicle and the like. For example, if an agreement is made "to provide the unit at the center of the vehicle", the position of the unit can be specified by the size of the vehicle in some cases.

In addition to information on the position as described above, information on an electric power transmission/reception method (a resonance method, an electromagnetic induction method, a microwave method or the like) may be transmitted together.

Referring again to FIG. 9 and FIG. 10, the electric power transmission device 200 determines whether or not the electric power reception unit of the vehicle 100 can be aligned with the electric power transmission unit 220, on the basis of the arrangement of the electric power transmission unit 220 in the parking space and received information associated with the electric power reception units 110A to 110D of the vehicle. The electric power transmission device 200 then returns to the vehicle a message M2 including information on whether or not electric power transmission is possible. The message M2 indicates that electric power can be transmitted if the electric power reception unit of the vehicle 100 can be aligned with the electric power transmission unit 220, and indicates that electric power cannot be transmitted if the electric power reception unit of the vehicle 100 cannot be aligned with the electric power transmission unit 220.

Incidentally, before determining whether or not the alignment can be made as to positional information, a determination on whether or not electric power transmission is possible may first be made on the basis of information on the electric power transmission/reception method.

This result is displayed by the display portion of the vehicle or acoustically conveyed, so that the driver determines whether to park the vehicle in the parking space of this electric power transmission device 200 or not, and determines whether to receive electric power from the electric power transmission device 200 or not.

Figure 13:
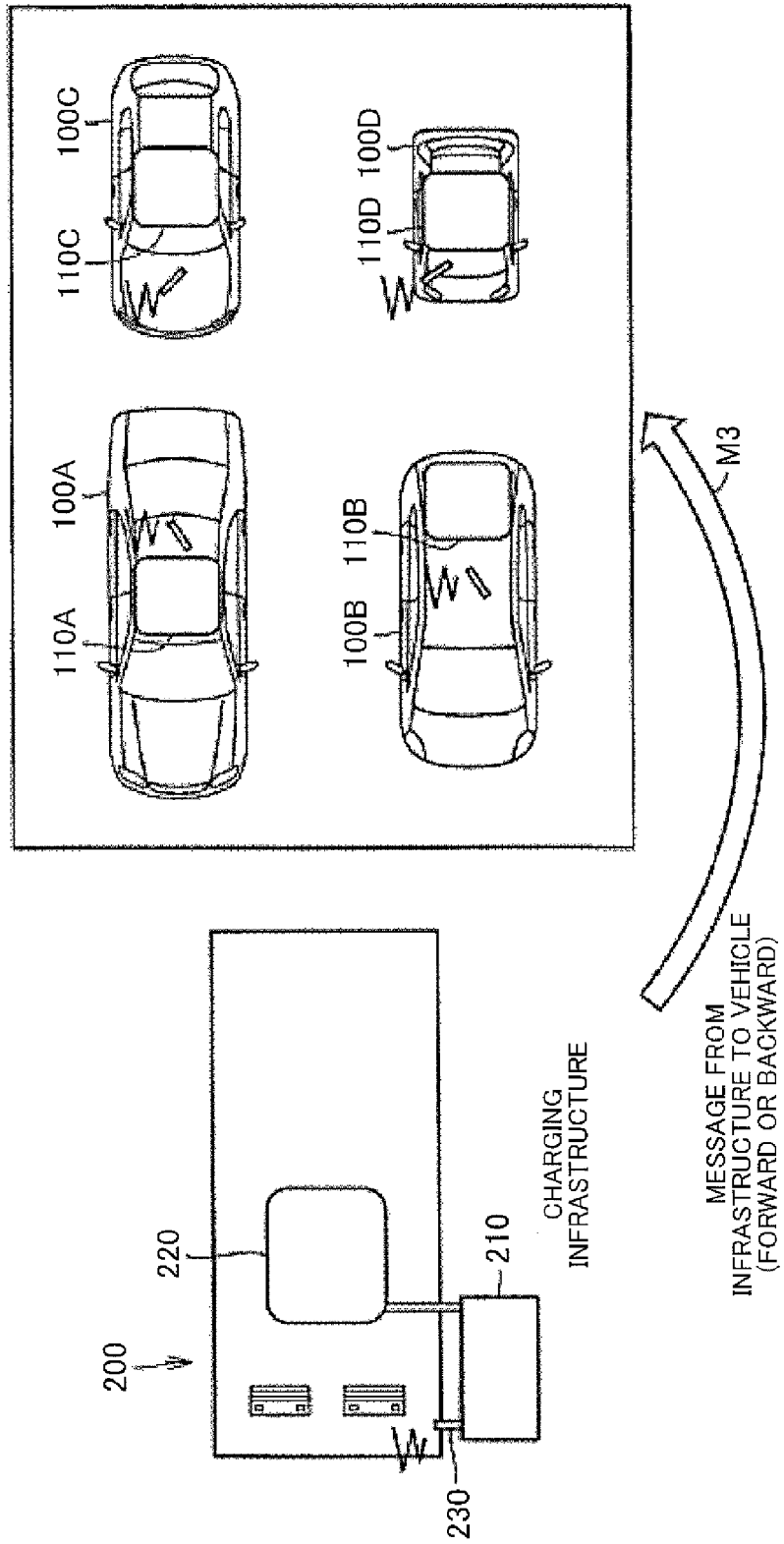
FIG. 13 is a view for illustrating a second example in which communication is established according to the processing of FIG. 9.

FIG. 13 is a view for illustrating a second example in which communication is established in accordance with the processing of FIG. 9. Referring to FIG. 9 and FIG. 13, the message M1 from the vehicle to the electric power transmission device is transmitted in step S20 and step S120. The message M1 includes information associated with the electric power reception unit 110 of the vehicle. Since the message M1 has been described with reference to FIG. 12, the description thereof will not be repeated.

Then, the electric power transmission device 200 determines, on the basis of the arrangement of the electric power transmission unit 220 in the parking space and received information associated with the electric power reception units 110A to 110D of the vehicle, whether the electric power reception unit of the vehicle 100 can be aligned with the electric power transmission unit 220 when the vehicle is parked forward or when the vehicle is parked backward. Incidentally, in the present specification, "forward parking" means the direction of parking in which the vehicle moves forward toward the wheel stoppers to be parked, and "backward parking" means the direction of parking in which the vehicle moves backward toward the wheel stoppers to be parked. There may be no wheel stopper in some cases. Therefore, the forward direction and the backward direction may be construed as a direction coincident with a predetermined direction and a direction reverse thereto, respectively.

The electric power transmission device 200 then returns to the vehicle a message M3 including the guidance direction of the vehicle, namely, the forward direction or the backward direction. This result is displayed by the display portion of the vehicle, or is acoustically conveyed, so that the driver can find out whether to park the vehicle forward or backward in parking the vehicle in the parking space of this electric power transmission device 200. Incidentally, in order for the driver to understand with ease, a sign such as "Move Forward and Park", "Move Backward and Park" or the like may be displayed.

Incidentally, the positional guidance in the longitudinal direction has been described above. However, guidance may be carried out in the lateral direction. For example, a sign such as "Park Close to the Left Side (or Close to the Right Side) of a Parking Frame" or the like may be displayed.

As described above, according to the first embodiment of the invention, information on the secondary-side unit is conveyed in advance to the primary-side unit. Thus, even if charging operation is actually not performed between the primary-side unit and the secondary-side unit, the primary-side unit can be brought into a state suited for charging.

Besides, since information on the secondary-side unit is conveyed in advance, an appropriate guidance direction of the vehicle as well as whether or not non-contact charging is possible can be determined beforehand. Therefore, an improvement in user-friendliness is achieved.

Second Embodiment

In the second embodiment of the invention, an example in the case where an electric power transmission device is provided with a plurality of electric power transmission units or a movable electric power transmission unit will be described. In the second embodiment of the invention, a processing of selecting or moving an electric power transmission coil is performed as indicated by steps S132 and S134, in addition to the processing described with reference to FIG. 9 of the first embodiment of the invention.

Figure 14:
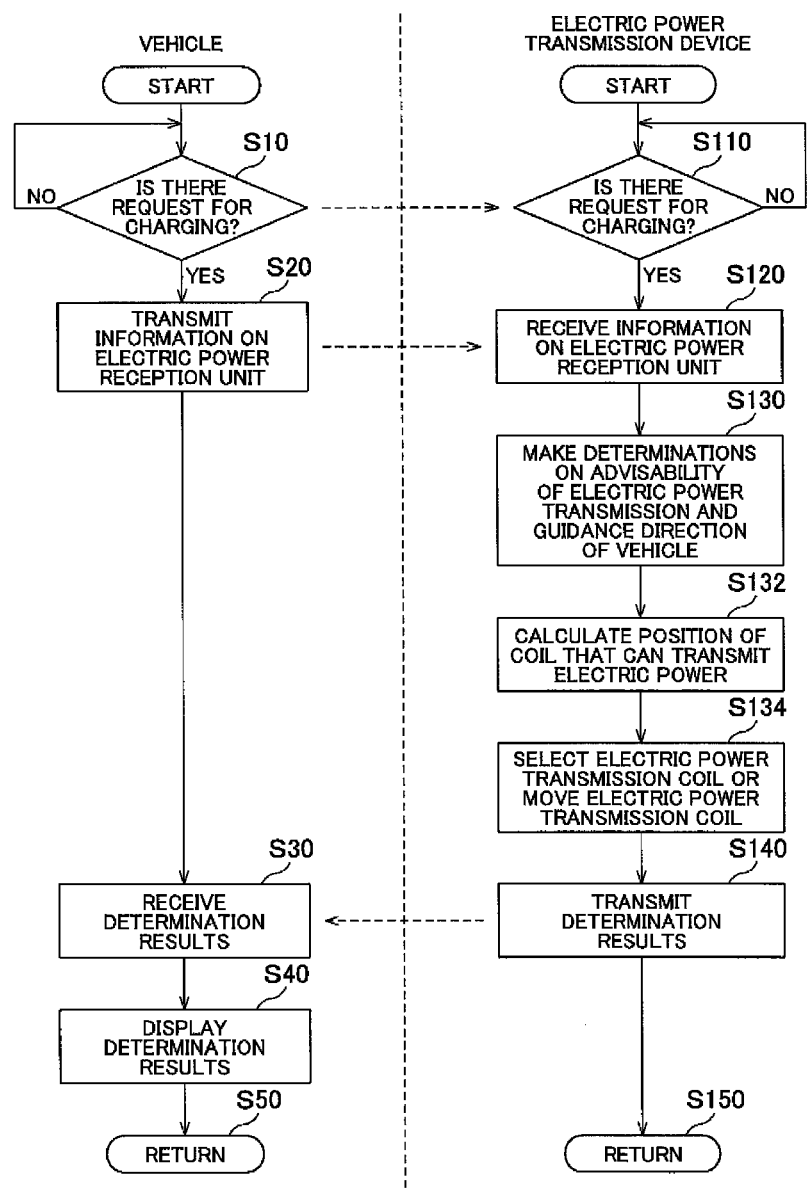
FIG. 14 is a flowchart for illustrating the control performed in a vehicle and an electric power transmission device in the second embodiment of the invention.

FIG. 14 is a flowchart for illustrating the control performed in the vehicle and the electric power transmission device in the second embodiment of the invention.

Referring to FIG. 6 and FIG. 14, in the vehicle 100, in step S10, the vehicle ECU 300 monitors whether or not there is a request for charging. If it is detected that the charging start signal TRG has been input due to an operation by the user or the like, the vehicle ECU 300 transmits to the electric power transmission device 200 a message indicating that there is a request for charging, via the communication portion 160. Then, the processing proceeds from step S10 to step S20.

On the other hand, in the electric power transmission device 200, in step S110, the electric power transmission ECU 240 monitors whether or not there is a request for charging. If a message indicating that a request for charging has been made is transmitted from the communication portion 160 of the vehicle 100 and the electric power transmission ECU 240 detects the request for charging via the communication portion 230, the processing proceeds from step S110 to step S120.

In the vehicle 100, in step S20, information on the electric power reception unit 110 is transmitted toward the electric power transmission device 200 by the communication portion 160. In the electric power transmission device 200, in step S120, information on the electric power reception unit 110 is received by the communication portion 230.

In step S130, in the electric power transmission device 200, the electric power transmission ECU 240 makes determinations on whether or not electric power transmission is possible, and a guidance direction of the vehicle. Then, in step S132, the electric power transmission ECU 240 calculates a position of an electric power transmission unit (an electric power transmission coil) that can transmit electric power, in such a manner as to correspond to the position of the electric power reception unit 110 of the vehicle.

Furthermore, in step S134, the electric power transmission ECU 240 selects an electric power transmission unit in the case where the electric power transmission device has a plurality of electric power transmission units. In the case where the electric power transmission device has a movable electric power transmission unit, the electric power transmission ECU 240 moves the electric power transmission unit to a position that enables electric power transmission. The selection or movement of the electric power transmission unit is carried out such that the electric power transmission unit and the electric power reception unit establish a positional relationship that guarantees the best efficiency of electric power reception.

Furthermore, in step S140, the electric power transmission ECU 240 transmits to the vehicle 100, via the communication portion 230, results of determinations on whether or not electric power transmission is possible and the guidance direction of the vehicle.

In the vehicle 100, in step S30, the determination results are received by the communication portion 160, and the vehicle ECU 300 causes a display portion such as a liquid crystal display (not shown) or the like to display the determination results. Incidentally, instead of causing the display portion to display the determination results, the driver may be acoustically notified of the determination results.

If the aforementioned processing ends, the processing returns to a main routine of the vehicle and the electric power transmission device in step S50 and step S150.

Figure 15:
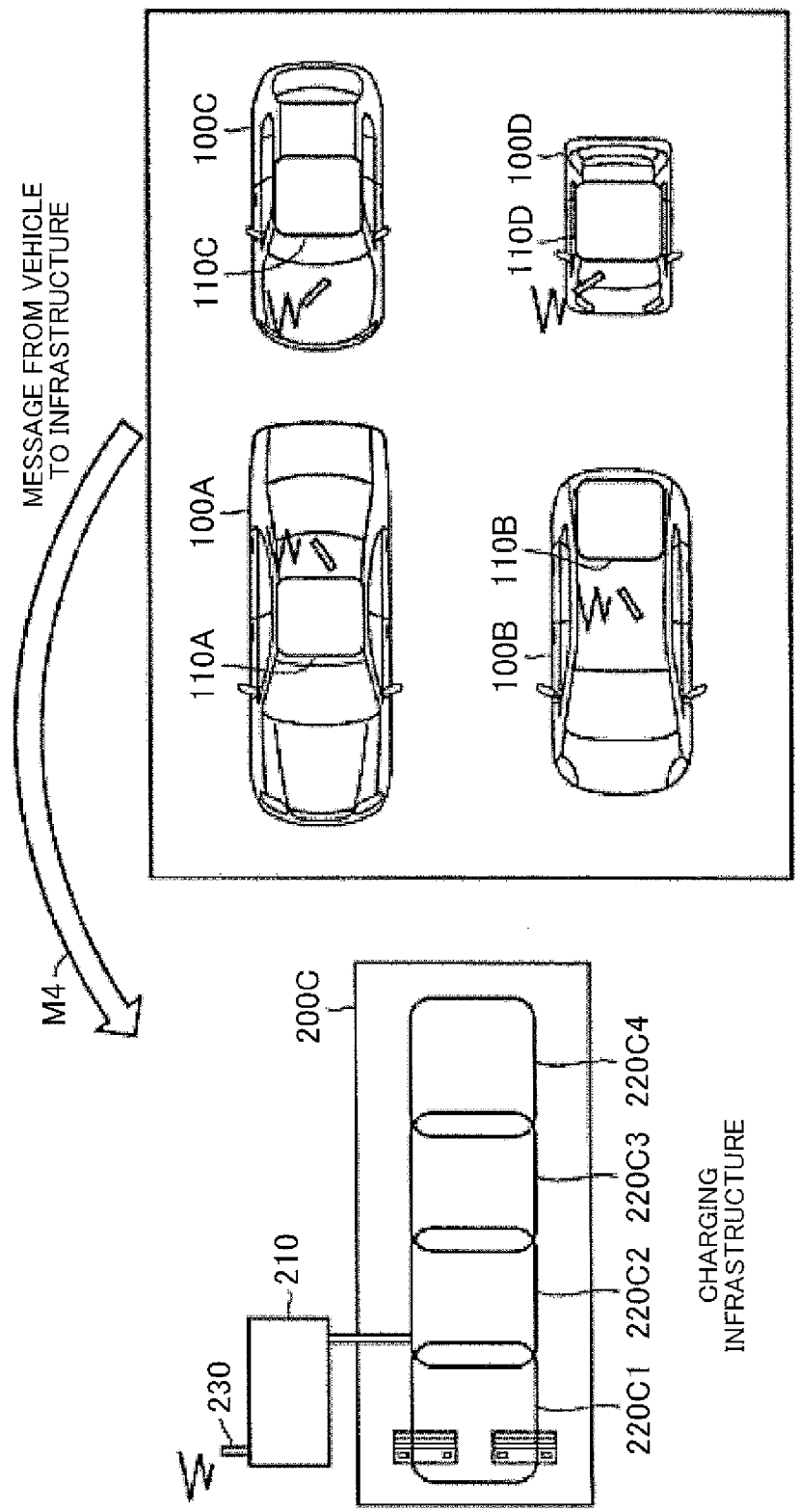
FIG. 15 is a view for illustrating a first example in which communication is established according to a processing of FIG. 14.

FIG. 15 is a view for illustrating a first example in which communication is established according to the processing of FIG. 14. FIG. 15 shows an electric power transmission device 200C that has a plurality of electric power transmission units 220C1 to 220C4.

Referring to FIG. 14 and FIG. 15, in step S20 and step S120, a message M4 from the vehicle to the electric power transmission device is transmitted. The message M4 includes information associated with the electric power reception unit 110 of the vehicle. The information associated with the electric power reception unit of the vehicle, which is included in the message M4, is similar to the message M1 described with reference to FIGS. 10 to 12. Therefore, the description of the information will not be repeated.

The electric power transmission device 200 selects the electric power transmission unit used for electric power transmission, on the basis of the information on the electric power reception unit of the vehicle. Besides, the electric power transmission device 200 determines whether the guidance direction of the vehicle is appropriate as a forward parking direction or as a backward parking direction, on the basis of a mounting position of the electric power reception unit in the vehicle and a position of installation of the electric power transmission unit.

For example, in the case where the electric power reception unit is provided in a substantially central region of the vehicle as is the case with the vehicle 100A, the electric power transmission device 200C selects electric power transmission unit 220C2 or 220C3. For example, in the case where the electric power reception unit is provided in the vicinity of the rear wheels of the vehicle as is the case with the vehicle 110B, the electric power transmission device 200C guides the vehicle such that the vehicle is parked backward, and selects the electric power transmission unit 220C1. Incidentally, the electric power transmission device 200C may guide the vehicle such that the vehicle is parked forward, and select the electric power transmission unit 220C3 or 220C4.

Figure 16:
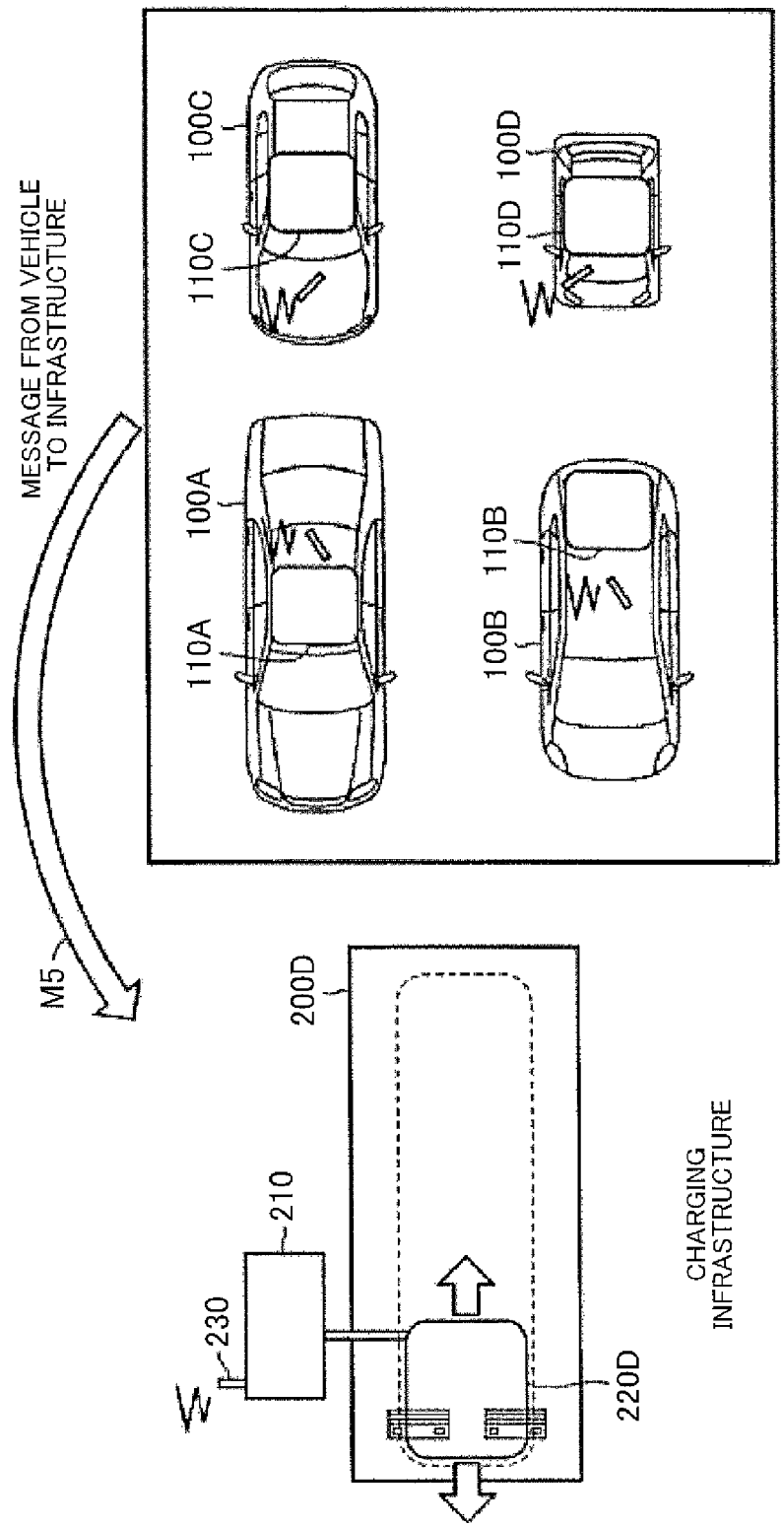
FIG. 16 is a view for illustrating a second example in which communication is established according to the processing of FIG. 14.

FIG. 16 is a view for illustrating a second example in which communication is established according to the processing of FIG. 14. FIG. 16 shows the electric power transmission device 200D that has a movable electric power transmission unit 220D.

Referring to FIG. 14 and FIG. 16, in step S20 and step S120, a message M5 from the vehicle to the electric power transmission device is transmitted. The message M5 includes information associated with the electric power reception unit 110 of the vehicle. The information associated with the electric power reception unit of the vehicle, which is included in the message M5, is similar to the message M1 described with reference to FIGS. 10 to 12. Therefore, the description of the information will not be repeated.

Incidentally, in FIG. 15 and FIG. 16, there are shown examples in which a plurality of electric power transmission units are provided offset from one another in the longitudinal direction of the vehicle and an electric power transmission unit is movable in the longitudinal direction of the vehicle. However, a plurality of electric power transmission units may be provided in the lateral direction of the vehicle, or an electric power transmission unit may be movable in the lateral direction of the vehicle.

Besides, positional guidance in the longitudinal direction has been described above. However, guidance in the lateral direction may be carried out. For example, a sign such as "Park Close to the Left Side (or Close to the Right Side) of the Parking Frame" may be displayed.

The electric power transmission device 200 determines a position to which the electric power transmission unit used for electric power transmission is moved, on the basis of the information on the electric power reception unit of the vehicle. This position is a position of the electric power transmission unit at which the vehicle can be charged in a shortest charging time (most efficiently). This position can be made to be a position at which, for example, the deviation between the central axes of the electric power reception unit and the electric power transmission unit in the horizontal direction is minimized.

As described above, according to the second embodiment of the invention, information on the secondary-side unit is conveyed in advance to the primary-side unit. Thus, even if charging operation is actually not performed between the primary-side unit and the secondary-side unit, the primary-side unit can be brought into a state suited for charging.

Besides, since information on the secondary-side unit is conveyed in advance, an appropriate guidance direction of the vehicle as well as whether or not non-contact charging is possible can be determined beforehand. Therefore, an improvement in user-friendliness is achieved.

Furthermore, the primary unit can be appropriately selected or moved beforehand. Therefore, the time to the start of charging can be shortened.

Third Embodiment

Figure 17:
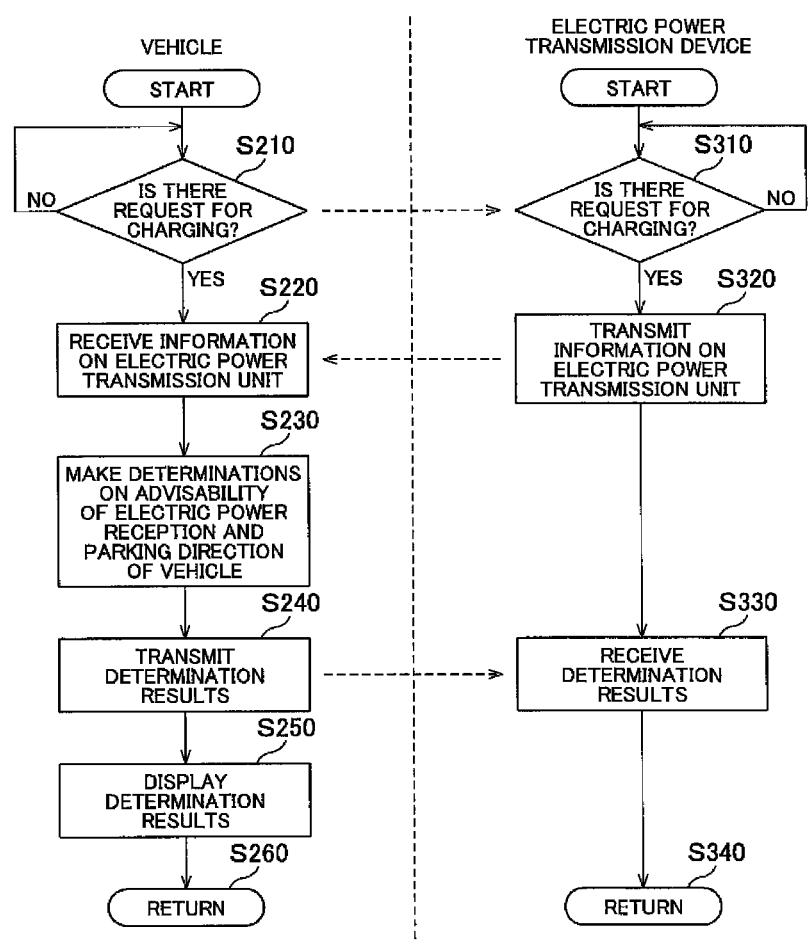
FIG. 17 is a flowchart for illustrating the control performed in a vehicle and an electric power transmission device in the third embodiment of the invention.

FIG. 17 is a flowchart for illustrating the control performed in the vehicle and the electric power transmission device in the third embodiment of the invention.

Referring to FIG. 6 and FIG. 17, in the vehicle 100, in step S210, the vehicle ECU 300 monitors whether or not there is a request for charging. If it is detected that the charging start signal TRG has been input through an operation by the user or the like, the vehicle ECU 300 transmits to the electric power transmission device 200 a message indicating that there is a request for charging, via the communication portion 160. Then, the processing proceeds from step S210 to step S220.

On the other hand, in the electric power transmission device 200, in step S310, the electric power transmission ECU 240 monitors whether or not there is a request for charging. If the message indicating that a request for charging has been made is transmitted from the communication portion 160 of the vehicle 100 and the electric power transmission ECU 240 detects the request for charging via the communication portion 230, the processing proceeds from step S310 to step S320.

In the electric power transmission device 200, in step S320, information on the electric power transmission unit 220 is transmitted toward the electric power transmission device 200 by the communication portion 230. In the vehicle 100, in step S220, information on the electric power transmission unit 220 is received by the communication portion 160.

In step S230, in the vehicle 100, the vehicle ECU 300 makes determinations on whether or not electric power transmission is possible, and a parking direction of the vehicle. Then, in step S240, the vehicle ECU 300 transmits the determination results toward the electric power transmission device 200 via the communication portion 160.

In the electric power transmission device 200, the determination results are received by the communication portion 230 in step S330. In the electric power transmission device 200, a preparation for electric power transmission is made in accordance with the received results.

On the other hand, in the vehicle 100, in step S250, the vehicle ECU 300 causes the display portion such as a liquid crystal display (not shown) or the like to display the determination results. Incidentally, instead of causing the display portion to display the determination results, the driver may be acoustically notified of the determination results.

If the aforementioned processing ends, the processing returns to the main routine of the vehicle and the electric power transmission device in step S260 and step S240.

Figure 18:
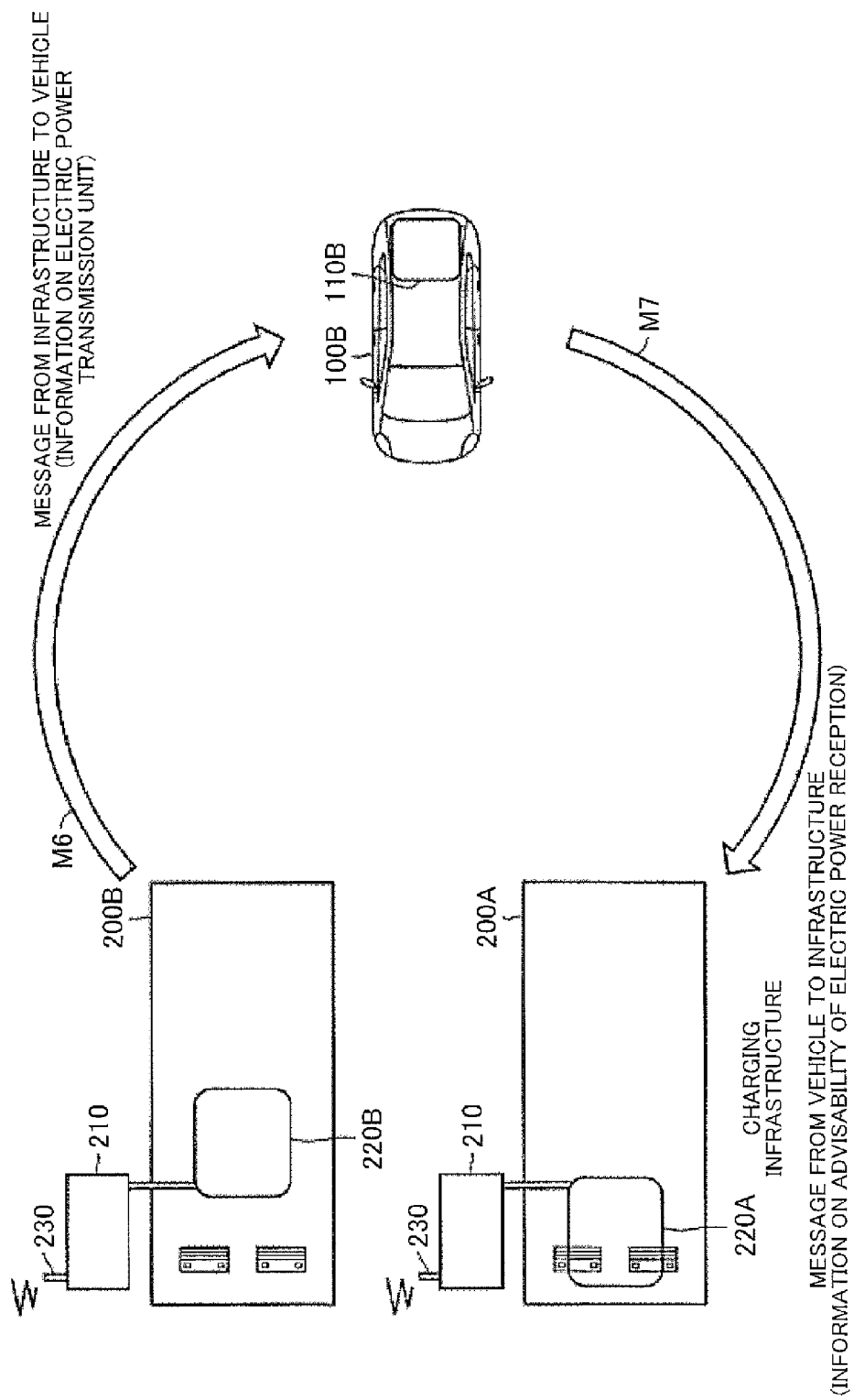
FIG. 18 is a view for illustrating a first example in which communication is established according to a processing of FIG. 17.

FIG. 18 is a view for illustrating a first example in which communication is established according to the processing of FIG. 17. Referring to FIG. 17 and FIG. 18, in step S220 and step S320, a message M6 from the electric power transmission device 200A or 200B to the vehicle 100B is transmitted. The message M6 includes information associated with the electric power transmission unit 220A or 220B of the electric power transmission device.

Figure 19:
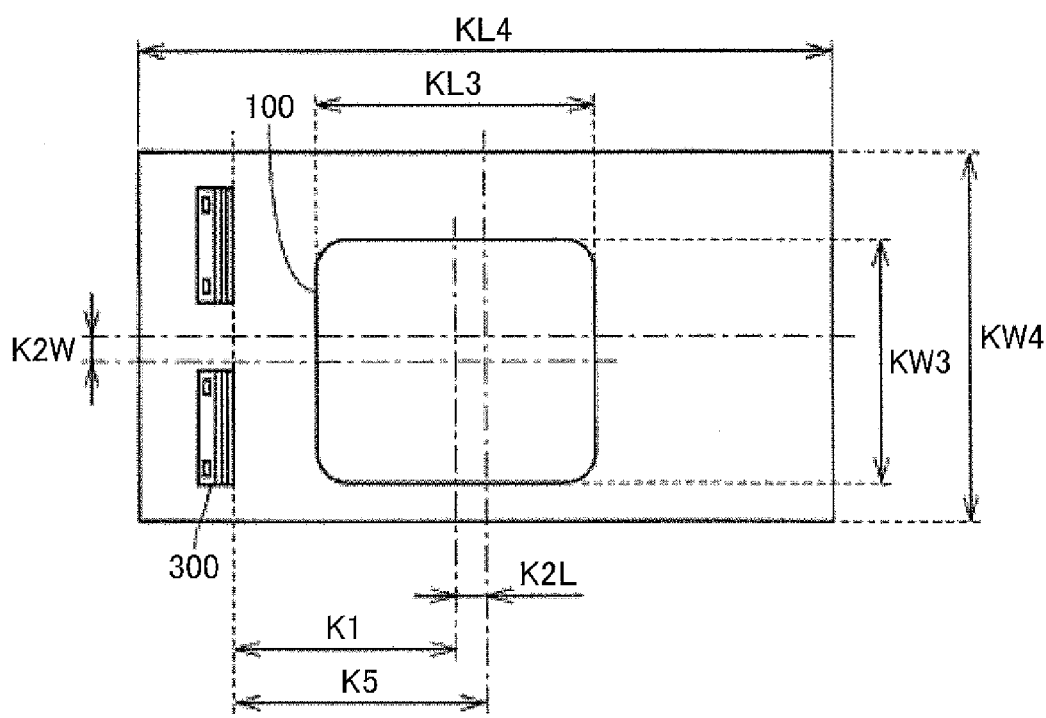
FIG. 19 is a top view for illustrating information associated with an electric power transmission unit of the electric power transmission device.
Figure 20:
FIG. 20 is a lateral view for illustrating information associated with the electric power transmission unit of the electric power transmission device.

FIG. 19 is a top view for illustrating information associated with the electric power transmission unit of the electric power transmission device. FIG. 20 is a lateral view for illustrating information associated with the electric power transmission unit of the electric power transmission device.

The information associated with the electric power transmission unit of the electric power transmission device, which is included in the message M6, includes the following data 11) to 16):

11) a distance K1 (mm) from the front ends of the wheel stoppers to the center of gravity (or the center) of the electric power transmission unit;

12) distances K2L and K2W (mm) of deviations from the center of gravity (or the center) of the electric power transmission unit and the center of a parking space;

13) (longitudinal and lateral) sizes KL3 and KW3 (mm) of the electric power transmission unit;

14) (longitudinal and lateral) sizes KL4 and KW4 (mm) of the parking space;

15) a distance K5 (mm) from the center of gravity (or the center) of the parking space to the front ends of the wheel stoppers; and 16) a height KH6 (mm) of an upper face of the electric power transmission unit above the ground.

Incidentally, the center of gravity of the electric power transmission unit means the center of gravity of the contour of a unit that is projected onto a plane. Besides, in the present specification, the center of a unit means the center of a circle if the unit is circular in shape, and means the center of an inscribed circle or a circumscribed circle of a polygon if the unit is polygonal in shape. Besides, in addition to the center of gravity or the center, any piece of information that allows the position of the unit to be specified, for example, the position of an end of the unit or the like can be used instead. Besides, in the case where the unit has directivity or the like, a mounting angle may be included in the aforementioned information. It should be noted herein that the mounting angle means a rotational angle with respect to a longitudinal direction (or a length direction) of the parking space.

"The information on the position or dimension of the unit" can also include a size of the vehicle and the like. For example, if an agreement is made "to provide the unit at the center of the vehicle", the position of the unit can be specified by the size of the vehicle in some cases.

In addition to information on the position as described above, information on an electric power transmission/reception method (a resonance method, an electromagnetic induction method, a microwave method or the like) may be transmitted together.

Referring again to FIG. 17 and FIG. 18, the vehicle 100B determines whether or not the electric power reception unit of the vehicle 100B can be aligned with the electric power transmission unit 220A or 220B, on the basis of received information associated with the electric power transmission unit 220A or 220B (information indicating the arrangement or the like in the parking space) and information on the mounting position of the electric power reception unit 110B of the vehicle. Then, the vehicle 100 returns a message M7 including information on whether or not electric power transmission to the vehicle is possible. The message M7 indicates that electric power can be transmitted if the electric power reception unit of the vehicle 100B can be aligned with the electric power transmission unit 220A or 220B, and that electric power cannot be transmitted if the electric power reception unit of the vehicle 100B cannot be aligned with the electric power transmission unit 220A or 220B.

Incidentally, before determining whether or not the alignment can be made as to positional information, a determination on whether or not electric power transmission is possible may first be made on the basis of information on the electric power transmission/reception method.

This result is displayed by the display portion of the vehicle or acoustically conveyed, so that the driver determines whether to park the vehicle in the parking space of one of these electric power transmission devices 200A and 200B or not, and determines whether to receive electric power from the electric power transmission device 200A or 200B.

Figure 21:
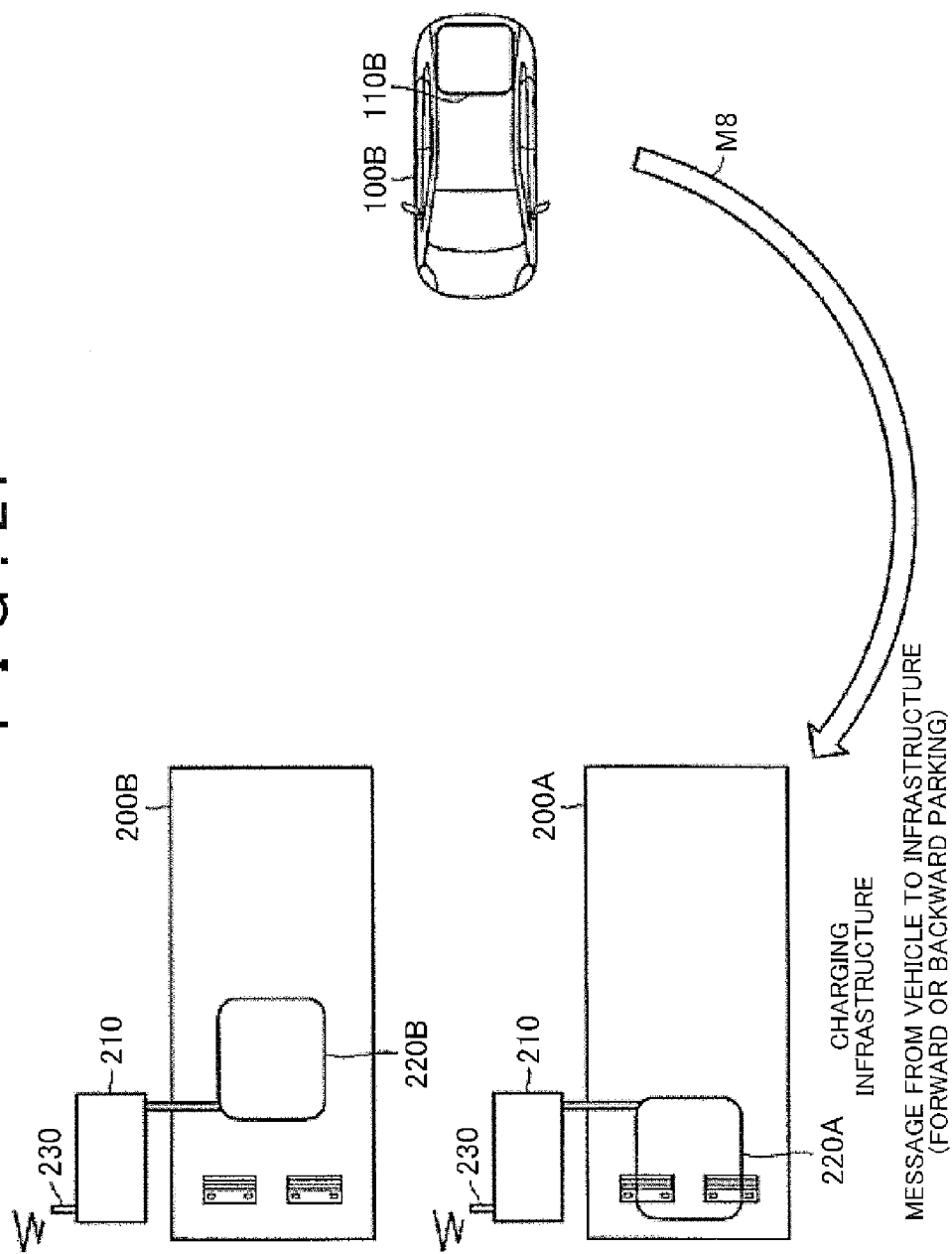
FIG. 21 is a view for illustrating a second example in which communication is established according to the processing of FIG. 17.

FIG. 21 is a view for illustrating a second example in which communication is established in accordance with the processing of FIG. 17. Referring to FIG. 17 and FIG. 21, the message M6 is transmitted from the electric power transmission device to the vehicle in step S220 and step S320. The message M6 includes information associated with the electric power transmission unit 220A or 220B of the electric power transmission device. The message M6 includes the information described with reference to FIGS. 18 to 20, and the description of the information will not be repeated herein.

Then, the vehicle 100B determines, on the basis of received information associated with the electric power transmission unit 220A or 220B (the arrangement of the electric power transmission unit 220 in the parking space or the like) and information on the mounting position of the electric power reception unit 110B in the vehicle, whether the electric power reception unit of the vehicle 100B can be aligned with the electric power transmission unit 220A or 220B when the vehicle is parked forward or when the vehicle is parked backward. Then, the vehicle 100B returns to the vehicle a message M8 including the parking direction of the vehicle, namely, the forward direction or the backward direction.

This result is transmitted to the electric power transmission device, and is displayed by the display portion of the vehicle or acoustically conveyed in step S250, so that the driver can find out whether to park the vehicle forward or backward in parking the vehicle in the parking space of this electric power transmission device 200A or 200B.

As described above, according to the third embodiment of the invention, information on the primary-side unit is conveyed in advance to the secondary-side unit. Thus, even if charging operation is actually not performed between the primary-side unit and the secondary-side unit, the secondary-side unit can be brought into a state suited for charging.

Besides, since information on the primary-side unit is conveyed in advance, an appropriate parking direction of the vehicle as well as whether or not non-contact charging is possible can be determined beforehand. Therefore, an improvement in user-friendliness is achieved.

Fourth Embodiment

In the fourth embodiment of the invention, an example in the case where a vehicle is provided with a plurality of electric power reception units or a movable electric power reception unit will be described. In the fourth embodiment of the invention, a processing of selecting or moving an electric power reception coil is performed as indicated by steps S232 and S234, in addition to the processing described with reference to FIG. 17 of the third embodiment of the invention.

Figure 22:
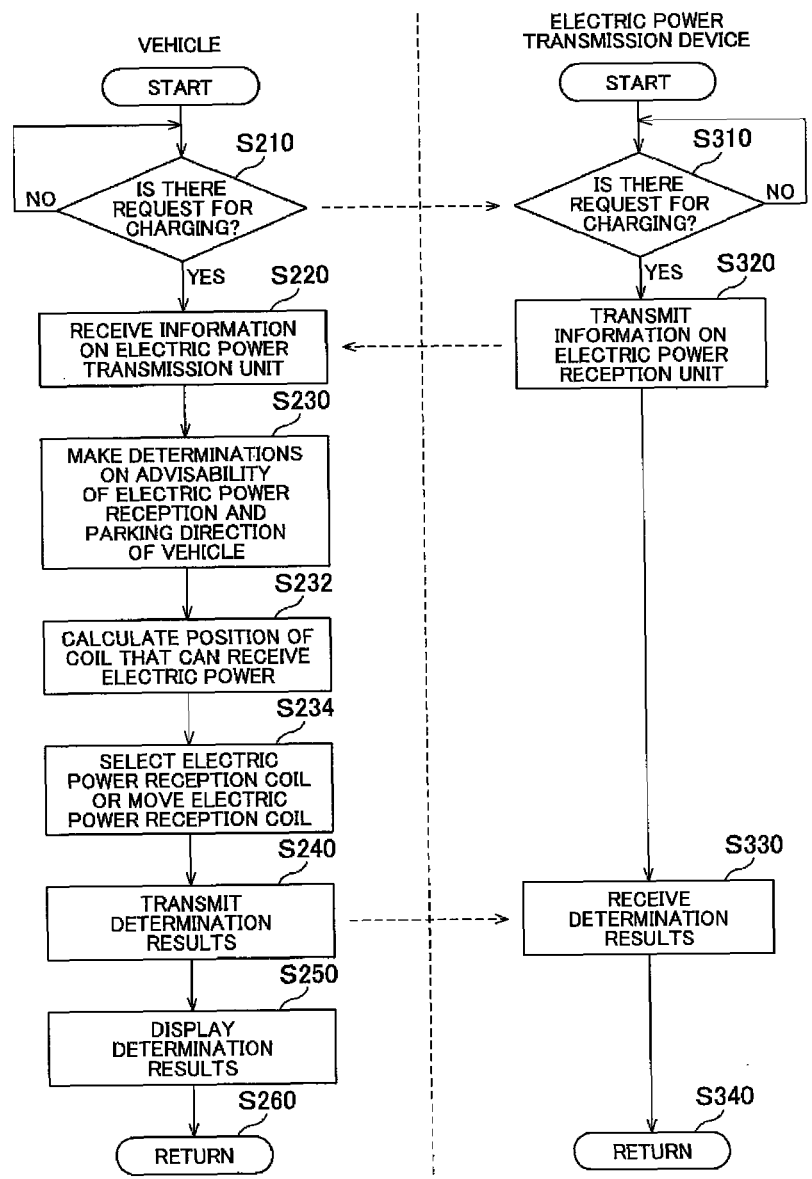
FIG. 22 is a flowchart for illustrating the control performed in a vehicle and an electric power transmission device in the fourth embodiment of the invention.

FIG. 22 is a flowchart for illustrating the control performed in the vehicle and the electric power transmission device in the fourth embodiment of the invention.

Referring to FIG. 6 and FIG. 22, in the vehicle 100, in step S210, the vehicle ECU 300 monitors whether or not there is a request for charging. If it is detected that the charging start signal TRG has been input due to an operation by the user or the like, the vehicle ECU 300 transmits a message indicating that there is a request for charging, to the electric power transmission device 200 via the communication portion 160. Then, the processing proceeds from step S210 to step S220.

On the other hand, in the electric power transmission device 200, in step S310, the electric power transmission ECU 240 monitors whether or not there is a request for charging. If a message indicating that a request for charging has been made is transmitted from the communication portion 160 of the vehicle 100 and the electric power transmission ECU 240 detects the request for charging via the communication portion 230, the processing proceeds from step S310 to step S320.

In the electric power transmission device 200, in step S320, information on the electric power transmission unit 220 is transmitted toward the electric power transmission device 200 by the communication portion 230. In the vehicle 100, in step S220, information on the electric power transmission unit 220 is received by the communication portion 160.

In step S230, in the vehicle 100, the vehicle ECU 300 makes determinations on whether or not electric power transmission is possible, and a parking direction of the vehicle. Then, in step S232, the vehicle ECU 300 calculates a position of an electric power reception unit (an electric power reception coil) that can receive electric power, in such a manner as to correspond to the position of the electric power transmission unit 220.

Furthermore, in step S234, the vehicle ECU 300 selects an electric power reception unit in the case where the vehicle has a plurality of electric power reception units. In the case where the vehicle has a movable electric power reception unit, the vehicle ECU 300 moves the electric power reception unit to a position that enables electric power reception. The selection or movement of the electric power reception unit is carried out such that the electric power transmission unit and the electric power reception unit establish a positional relationship that guarantees the best electric power reception efficiency. This positional relationship can ensure, for example, a minimum deviation between the central axes of the electric power reception unit and the electric power transmission unit in the horizontal direction.

Furthermore, in step S240, the vehicle ECU 300 transmits determination results toward the electric power transmission device 200 via the communication portion 160.

In the electric power transmission device 200, in step S330, the determination results are received by the communication portion 230. In the electric power transmission device 200, a preparation for electric power transmission is made in accordance with the received results.

On the other hand, in the vehicle 100, in step S250, the vehicle ECU 300 causes the display portion such as a liquid crystal display (not shown) or the like to display the determination results. Incidentally, instead of causing the display portion to display the determination results, the driver may be acoustically notified of the determination results.

If the aforementioned processing ends, the processing returns to the main routine of the vehicle and the electric power transmission device in step S260 and step S240.

FIG. 23 is a view for illustrating a first example in which communication is established according to the processing of FIG. 22. FIG. 23 shows the vehicle 100B that has a plurality of electric power reception units 110B1 to 110B3.

Referring to FIG. 22 and FIG. 23, in step S220 and step S320, a message M9 is transmitted from the electric power transmission device to the vehicle. The message M9 includes information associated with the electric power transmission unit 220A or 220B of the electric power transmission device. The information associated with the electric power transmission unit of the electric power transmission device, which is included in the message M9, is similar to the message M6 described with reference to FIGS. 18 to 20. Therefore, the description of the information will not be repeated.

The vehicle 100B selects the electric power reception unit used for electric power reception among the electric power reception units 110B1 to 110B3, on the basis of the information on the electric power transmission unit of the electric power transmission device. Besides, the vehicle 110B determines whether the parking direction of the vehicle is appropriate as a forward parking direction or as a backward parking direction, on the basis of a mounting position of the electric power reception unit in the vehicle and a position of installation of the electric power transmission unit.

For example, in the case where the electric power transmission unit 220A is provided in the vicinity of the wheel stoppers as is the case with the electric power transmission device 200A, the vehicle 100B selects either a combination of forward parking and the electric power reception unit 110B1 or a combination of backward parking and the electric power reception unit 110B3. For example, in the case where the electric power transmission unit 220B is provided at a position spaced apart from the wheel stoppers as is the case with the electric power transmission device 200B, the vehicle 100B selects a combination of backward parking and the electric power reception unit 110B2. Incidentally, a combination of forward parking and the electric power reception unit 110B2 may be selected. The selection is made such that the positional relationship between the electric power transmission unit and the electric power reception unit guarantees the best electric power reception efficiency.

FIG. 24 is a view for illustrating a second example in which communication is established according to the processing of FIG. 22. FIG. 24 shows a vehicle 100BX that has a movable electric power reception unit 110BX.

Referring to FIG. 22 and FIG. 24, in step S220 and step S320, the message

M5 is transmitted from the vehicle to the electric power transmission device. The message M5 includes information associated with the electric power reception unit 110 of the vehicle. The information associated with the electric power reception unit of the vehicle, which is included in the message M5, is similar to the message M1 described with reference to FIGS. 10 to 12. Therefore, the description of the information will not be repeated.

The vehicle 100BX determines a position to which the electric power reception unit used for electric power reception is moved, on the basis of the information on the electric power transmission unit of the electric power transmission device. This position is a position of the coil at which the vehicle can be charged in a shortest charging time (most efficiently).

Incidentally, in FIG. 23 and FIG. 24, there are shown examples in which a plurality of electric power reception units are provided offset from one another in the longitudinal direction of the vehicle and an electric power reception unit is movable in the longitudinal direction of the vehicle. However, a plurality of electric power reception units may be provided in the lateral direction of the vehicle, or an electric power reception unit may be movable in the lateral direction of the vehicle.

Besides, positional guidance in the longitudinal direction has been described above. However, guidance in the lateral direction may be carried out. For example, a sign such as "Park Close to the Left Side (or Close to the Right Side) of the Parking Frame" may be displayed.

As described above, according to the fourth embodiment of the invention, information on the primary-side unit is conveyed in advance to the secondary-side unit. Thus, even if charging operation is actually not performed between the primary-side unit and the secondary-side unit, the secondary-side unit can be brought into a state suited for charging.

Besides, since information on the primary-side unit is conveyed in advance, an appropriate parking direction of the vehicle as well as whether or not non-contact charging is possible can be determined beforehand. Therefore, an improvement in user-friendliness is achieved.

Furthermore, since the secondary unit can be appropriately selected or moved beforehand, the time to the start of charging can be shortened.

Finally, the first to fourth embodiments of the invention will be summarized referring again to the drawings.

As shown in FIG. 6 and FIGS. 9 to 16, the invention according to each of the first and second embodiments thereof relates to the electric power reception device for the vehicle that can receive electric power from the electric power transmission device 200 outside the vehicle in a non-contact manner. The electric power reception device for the vehicle 100 is equipped with the electric power reception unit 110 that is configured to be able to receive electric power from the electric power transmission device 200 in a non-contact manner, and the communication portion 160 that transmits information on the electric power reception unit 110 (information on the position or dimension or the like thereof) to the electric power transmission device 200.

Preferably, the electric power reception device is equipped with the control device (the vehicle ECU 300) that controls the communication portion 160.

Preferably, before allowing the vehicle 100 to be parked at the electric power reception position of the electric power transmission device 200, the control device (the vehicle ECU 300) transmits pre-stored information on the electric power reception unit 110 to the electric power transmission device 200, with the aid of the communication portion 160.

Preferably, as described with reference to FIG. 11 and FIG. 12, the information on the electric power reception unit 110 includes information indicating at least one of the size of the electric power reception unit 110, the size of the vehicle 100 that is mounted with the electric power reception unit 110, the mounting position of the electric power reception unit 110 in the vehicle 100, and the mounting angle of the electric power reception unit 110 in the vehicle 100. Thus, the electric power transmission device side can make a determination on whether or not charging is possible before the start of charging, for a plurality of vehicles that are different in the mounting position of the electric power reception unit and the size of the electric power reception unit from one another to various degrees. Besides, it is possible to confirm where the vehicle position essentially suited for charging is, regardless of whether or not charging has been started.

More preferably, the control device (the vehicle ECU 300) receives from the electric power transmission device 200 the determination result about the advisability of whether or not non-contact charging is possible on which the determination has been made on the basis of information on the electric power reception unit 110, and notifies a passenger of the determination result. Whether or not non-contact charging is possible is known beforehand even if the vehicle is actually not parked to make an attempt to receive electric power. Therefore, an improvement in user-friendliness is achieved.

More preferably, the control device (the vehicle ECU 300) receives from the electric power transmission device 200 the determination result about the guidance direction of the vehicle on which the determination has been made on the basis of information on the electric power reception unit 110, and notifies the passenger of the determination result. The direction in which the vehicle should be parked is known beforehand even if the vehicle is actually not parked to make an attempt to receive electric power. Therefore, an improvement in user-friendliness is achieved.

More preferably, as shown in FIG. 15, the electric power transmission device 200C includes the plurality of the electric power transmission units 220C1 to 220C4. The control device (the vehicle ECU 300) transmits information to the electric power transmission device 200C with the aid of the communication portion 230, in order to determine the electric power transmission unit used for electric power transmission among the plurality of the electric power transmission units 220C1 to 220C4.

More preferably, as shown in FIG. 16, the electric power transmission device 200D includes the movable electric power transmission unit 220D. The control device (the vehicle ECU 300) transmits information to the electric power transmission device 200D with the aid of the communication portion 230, in order to determine the position of the electric power transmission unit 200D. In this manner, the electric power transmission unit can be appropriately adjusted in position beforehand. Therefore, the charging time can be shortened.

Preferably, the electric power transmission device 200 include's the electric power transmission unit 220. The electric power reception unit 110 is configured such that the difference between the natural frequencies of the electric power reception unit 110 and the electric power transmission unit 220 falls within ±10%.

More specifically, the coupling coefficient between the electric power reception unit 110 and the electric power transmission unit 220 is equal to or smaller than 0.1.

More specifically, the electric power reception unit 110 receives electric power from the electric power transmission unit 220 through at least one of a magnetic field that is formed between the electric power reception unit 110 and the electric power transmission unit 220 and oscillates at a specific frequency, and an electric field that is formed between the electric power reception unit 110 and the electric power transmission unit 220 and oscillates at a specific frequency.

As shown in FIG. 6 and FIGS. 7 to 24, the invention according to each of the third and fourth embodiments of the invention relates to the electric power transmission device 200 that can transmit electric power in a non-contact manner. The electric power transmission device 200 is equipped with the electric power transmission unit 220 that is configured to be able to transmit electric power to the vehicle 100 from outside the vehicle in a non-contact manner, and the communication portion 230 that transmits information on the electric power transmission unit 220 (information on the position or dimension thereof) to the vehicle 100.

Preferably, the electric power transmission device 200 is further equipped with the control device (the electric power transmission ECU 240) that controls the communication portion 230.

Preferably, the control device (the electric power transmission ECU 240) transmits pre-stored information on the electric power transmission unit 220 to the vehicle with the aid of the communication portion 230, before the vehicle 100 is parked at the electric power reception position of the electric power transmission device 200.

Preferably, as described with reference to FIG. 19 and FIG. 20, the information on the electric power transmission unit 220 includes information indicating at least one of the size of the electric power transmission unit 220, the size of the parking space in which the electric power transmission unit 220 is arranged, the mounting position of the electric power transmission unit 220 in the parking space, and the mounting angle of the electric power transmission unit 220 in the parking space. Thus, the vehicle side can make a determination on whether or not charging is possible before the start of charging, for a plurality of electric power transmission devices that are different in the mounting position of the electric power transmission unit and the size of the electric power transmission unit from one another to various degrees. Besides, it is possible to confirm where the vehicle position essentially suited for charging is, regardless of whether or not charging has been started.

More preferably, the control device (the electric power transmission ECU 240) receives from the vehicle the determination result about whether or hot non-contact charging is possible on which the determination has been made on the basis of information on the electric power transmission unit 220. Whether or not non-contact charging is possible is known beforehand even if the vehicle is actually not parked to make an attempt to receive electric power. Therefore, an improvement in user-friendliness is achieved.

More preferably, the control device (the electric power transmission ECU 240) receives from the vehicle the determination result about the advisability of non-contact charging on which the determination has been made on the basis of information on the electric power transmission unit 220. The advisability of non-contact charging is known beforehand even if the vehicle is actually not parked to make an attempt to receive electric power. Therefore, an improvement in user-friendliness is achieved.

More preferably, the control device (the electric power transmission ECU 240) receives from the vehicle 100 the determination result about the guidance direction of the vehicle 100 on which the determination has been made on the basis of information on the electric power transmission unit 220. The direction in which the vehicle should be parked is known beforehand even if the vehicle is actually not parked to make an attempt to receive electric power. Therefore, an improvement in user-friendliness is achieved.

More preferably, as shown in FIG. 23, the vehicle 100B includes the plurality of the electric power reception units 100B1 to 100B3. The control device (the electric power transmission ECU 240) transmits information to the vehicle with the aid of the communication portion 230, in order to determine the electric power reception unit used for electric power reception among the plurality of the electric power reception units 100B1 to 100B3.

More preferably, as shown in FIG. 24, the vehicle 100BX includes the movable electric power reception unit 110BX. The control device (the electric power transmission ECU 240) transmits information on the electric power transmission unit 220 to the vehicle with the aid of the communication portion 230, in order to determine the position of the electric power reception unit 110BX. In this manner, the electric power reception unit can be appropriately adjusted in position beforehand. Therefore, the charging time can be shortened.

Incidentally, in each of these embodiments of the invention, the electric power transmission unit and the electric power reception unit, which include the electromagnetic induction coils respectively, have been exemplified. However, the invention is also applicable to a resonance-type non-contact electric power transmission/reception device that does not include an electromagnetic induction coil (a resonance-type non-contact electric power transmission/reception device that employs only self-resonant coils). Besides, the invention is not limited to the resonance-type electric power transmission/reception device, but is also applicable to non-contact electric power transmission/reception devices that transmit/receive electric power according to other methods (electromagnetic induction, microwaves, light and the like).

The embodiments of the invention disclosed this time should be considered to be exemplary in all respects and non-limitative. The scope of the invention is indicated not by the aforementioned description but by the claims. The invention is intended to encompass all modifications that are equivalent in significance and range to the claims.

DESCRIPTION OF REFERENCE SYMBOLS

10 Electric Power Transmission/Reception System
89 Electric Power Transfer System
90, 200A, 220, 220A, 220B, 220C2, 220C1, 220C3, 220C1 to 220C4, 220D Electric Power Transmission Unit
91, 110, 110A to 110D, 110B1 to 110B3, 110BX Electric Power Reception Unit
92 First Coil
93 Second Coil
94, 99 Resonant Coil
95, 98 Capacitor
96 Third Coil
97 Fourth Coil
100, 100a to 100d, 100bx Vehicle
111, 340 Secondary Self-Resonant Coil
112, 222 Condenser
113, 350 Secondary Coil
130 Motor-Generator
140 Motive Power Transmission Gear
150 Driving Wheels
160, 230 Communication Portion
171 Current Sensor
172 Voltage Sensor 173 Load Resistor
174 Relay
180 Rectifier
190 Electric Storage Device
200, 200a to 200d Electric Power Transmission Device
210 Charging Stand
221, 330 Primary Self-Resonant Coil
223, 320 Primary Coil
240 Electric Power Transmission ECU
242 Display Portion
246 Fare Reception Portion
250 Electric Power Supply Portion
260 Matching Box
300 Vehicle ECU
310 High-Frequency Electric Power Supply
360 Load
PCU Power Control Unit

What is claimed is:

1. An electric power reception device for a vehicle that can receive electric power from an electric power transmission device outside the vehicle in a non-contact manner, the electric power reception device comprising:
    an electric power reception unit configured to receive electric power from the electric power transmission device in a non-contact manner;
    a communication portion configured to receive information on a physical size of the electric power transmission unit from the electric power transmission device; and
    a control device configured to determine whether or not non-contact charging is possible based on the information received by the communication portion.

2. The electric power reception device according to claim 1, wherein the control device is further configured to:
    receive, from the electric power transmission device, a determination result about whether or not non-contact charging is possible based on the information; and
    notify a passenger of the determination result.

3. The electric power reception device according to claim 1, wherein the control device is further configured to:
    receive, from the electric power transmission device, a determination result about a guidance direction of the vehicle based on the information; and
    notify a passenger of the determination result.

4. The electric power reception device according to claim 1, wherein:
    the vehicle includes a plurality of electric power reception units, and
    the control device is further configured to use the information to determine which of the plurality of electric power reception units is used to receive electric power.

5. The electric power reception device according to claim 1, wherein:
    the vehicle includes a movable electric power reception unit; and
    the control device is further configured to use the information to determine a position of the electric power reception unit.

6. An electric power reception device for a vehicle that can receive electric power from an electric power transmission device in a non-contact manner, wherein
    the electric power transmission device includes an electric power transmission unit that transmits electric power to the vehicle, and transmits information on a position or dimension of the electric power transmission unit to the electric power reception device for the vehicle,
    the electric power reception device comprising:
        a communication portion that receives information on a physical size of the electric power transmission unit from the electric power transmission device;
        an electric power reception unit configured to receive electric power from the electric power transmission unit in a non-contact manner; and
        a control device configured to determine whether or not non-contact charging is possible based on the information received by the communication portion.

7. The electric power reception device according to claim 6, wherein the control device is further configured to:
    receive, from the electric power transmission device, a determination result about whether or not non-contact charging is possible based on the information; and
    notify a passenger of the determination result.

8. The electric power reception device according to claim 6, wherein the control device is further configured to:
    receive, from the electric power transmission device, a determination result about a guidance direction of the vehicle based on the information; and
    notify a passenger of the determination result.

9. A non-contact electric power transmission/reception system comprising:
    an electric power reception device mounted in a vehicle; and
    an electric power transmission device located outside the vehicle;
    the electric power reception device including:
        an electric power reception unit that is configured to receive electric power from the electric power transmission device in a non-contact manner,
        a communication portion configured to receive information on a physical size of the electric power transmission unit from the electric power transmission device, and
        a control device configured to determine whether or not non-contact charging is possible based on the information received by the communication portion.

10. The non-contact electric power transmission/reception system according to claim 9, wherein the control device is further configured to:
    receive, from the electric power transmission device, a determination result about whether or not non-contact charging is possible based on the information; and
    notify a passenger of the determination result.

11. The non-contact electric power transmission/reception system according to claim 9, wherein the control device is further configured to:
    receive, from the electric power transmission device, a determination result about a guidance direction of the vehicle based on the information; and
    notify a passenger of the determination result.

* * * * *